United States Patent
Alawieh et al.

(10) Patent No.: US 12,439,367 B2
(45) Date of Patent: Oct. 7, 2025

(54) DETERMINING A POSITION OF AN ENTITY OF A WIRELESS COMMUNICATION NETWORK

(71) Applicant: Fraunhofer-Gesellschaft zur Förderung der angewandten Forschung e.V., Munich (DE)

(72) Inventors: Mohammad Alawieh, Erlangen (DE); Mohammad Momani, Erlangen (DE); Norbert Franke, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 363 days.

(21) Appl. No.: 18/301,042

(22) Filed: Apr. 14, 2023

(65) Prior Publication Data

US 2023/0319772 A1    Oct. 5, 2023

Related U.S. Application Data

(63) Continuation of application No. PCT/EP2021/078663, filed on Oct. 15, 2021.

(30) Foreign Application Priority Data

Oct. 16, 2020  (EP) .................... 20202436

(51) Int. Cl.
*H04W 64/00* (2009.01)
*H04B 17/318* (2015.01)
(Continued)

(52) U.S. Cl.
CPC .......... *H04W 64/00* (2013.01); *H04B 17/328* (2023.05); *H04L 5/0051* (2013.01); *H04W 16/28* (2013.01)

(58) Field of Classification Search
CPC .... H04W 64/00; H04W 16/28; H04B 17/328; H04L 5/0051
(Continued)

(56) References Cited

U.S. PATENT DOCUMENTS

| | | | |
|---|---|---|---|
| 12,057,918 B2 * | 8/2024 | Svendsen | H04W 56/001 |
| 2016/0277089 A1 | 9/2016 | Jung et al. | |

(Continued)

FOREIGN PATENT DOCUMENTS

| | | |
|---|---|---|
| GB | 2556030 A | 5/2018 |
| WO | 2020164743 A1 | 8/2020 |

OTHER PUBLICATIONS

3GPP TS 37.355, "3rd Generation Partnership Project; Technical Specification Group Radio Access Network; LTE Positioning Protocol (LPP) (Release 16)", TS 37.355 v16.1.0 LTE Positioning Protocol (LPP), Jul. 2020, 292 pp.

(Continued)

*Primary Examiner* — Sam K Ahn
(74) *Attorney, Agent, or Firm* — Perkins Coie LLP; Michael A. Glenn

(57) ABSTRACT

A position of a first entity of a wireless communication network is determined on the basis of one or more measurements between the first entity and a second entity. For one of the measurements, a reference signal is transmitted between the first and the second entities. The first and the second entities use respective antenna patterns for transmitting or receiving the reference signal. The position of the first entity is determined using antenna pattern information about the antenna pattern used by the first entity and/or antenna pattern information about the antenna pattern used by the second entity.

20 Claims, 12 Drawing Sheets

(51) Int. Cl.
   H04L 5/00      (2006.01)
   H04W 16/28     (2009.01)
(58) Field of Classification Search
   USPC ........................................... 455/456.1
   See application file for complete search history.

(56) References Cited

U.S. PATENT DOCUMENTS

| | | | |
|---|---|---|---|
| 2020/0145977 A1* | 5/2020 | Kumar | H04W 56/001 |
| 2020/0154240 A1* | 5/2020 | Edge | H04W 4/029 |
| 2020/0280820 A1 | 9/2020 | Zhang et al. | |
| 2022/0007206 A1* | 1/2022 | Choi | H04B 7/0617 |
| 2022/0026517 A1* | 1/2022 | Hasegawa | G01S 5/0236 |
| 2022/0124458 A1* | 4/2022 | Bao | H04W 72/20 |

OTHER PUBLICATIONS

3GPP TS 38.214, "3rd Generation Partnership Project; Technical Specification Group Radio Access Network; NR; Physical layer procedures for data (Release 16)", TS 38.214 v16.1.0 NR; Physical layer procedures for data, Mar. 2020, 151 pp.

3GPP TS 38.305, "3rd Generation Partnership Project; Technical Specification Group Radio Access Network; NG Radio Access Network (NG-RAN); Stage 2 functional specification of User Equipment (UE) positioning in NG-RAN (Release 16)", TS 38.305 v16.1.0 NG Radio Access Network (NG-RAN), Jul. 2020, 114.

3GPP TS 38.331, "3rd Generation Partnership Project; Technical Specification Group Radio Access Network; NR; Radio Resource Control (RRC) protocol specification (Release 16)", TS 38.331 v16.0.0 NR; Radio Resource Control (RRC); Protocol specification, Mar. 2020, 835 pp.

3GPP TS 38.455, "NR Positioning Protocol A (NRPPa) (Release 16)", TS 38.455 v16.0.0 NG-RAN; NR Positioning Protocol A (NRPPa), Jul. 2020, 60 pp.

Huawei, Hisilicon, "Angle resolution and beam configuration related to procedures for NR positioning", 3GPP Draft; vol. RAN WG1, No. Chongqing, China; Oct. 14, 2019-Oct. 20, 2019; Mobile Competence Centre; 650 Route Des Lucioles, F-06921 Sophia-Antipolis Cedex, France; R1-1910393.docx, (Oct. 5, 2019), XP051808552URL: https://ftp.3gpp.org/tsg_ran/WG1_RL1/TSGR1_98b/Docs/R1-1910393.zip, Oct. 5, 2019, 8 pp.

* cited by examiner

DETERMINING A POSITION OF AN ENTITY OF A WIRELESS COMMUNICATION NETWORK

CROSS-REFERENCE TO RELATED APPLICATIONS

This application is a continuation of copending International Application No. PCT/EP2021/078663, filed Oct. 15, 2021, which is incorporated herein by reference in its entirety, and additionally claims priority from European Application No. 20202436.0, filed Oct. 16, 2020, which is also incorporated herein by reference in its entirety.

Embodiments of the present invention refer to apparatuses for determining a position of an entity of a wireless communication network. Further embodiments refer to entities of a wireless communication network, for example core entities, user devices, base stations, transmission reception points. Further embodiments relate to methods for determining a position of an entity of a wireless communication network and methods for operating entities of a wireless communication network. Some embodiments relate to angle of departure or angle of arrival measurements, for example, as specified for 5G or NR communication networks by 3GPP.

BACKGROUND OF THE INVENTION

FIG. 1 is a schematic representation of an example of a terrestrial wireless network 100 including, as is shown in FIG. 1A, the core network 102 and one or more radio access networks $RAN_1$, $RAN_2$, ... $RAN_N$. FIG. 1B is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A base station may include one or more transmission reception points (TRPs). A TRP may include one or more antennas ANT for transmitting and/or receiving radio signals. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1B shows an exemplary view of five cells, however, the $RAN_n$ may include more or less such cells, and $RAN_n$ may also include only one base station. FIG. 1B shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1B shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base stations $gNB_1$ to $gNB_5$ may be connected to the core network 102, e.g. via the S1 interface, via respective backhaul links $114_1$ to $114_5$, which are schematically represented in FIG. 1B by the arrows pointing to "core". The core network 102 may be connected to one or more external networks. The external network may be the Internet or a private network, such as an intranet or any other type of campus networks, e.g. a private WiFi or 4G or 5G mobile communication system. Further, some or all of the respective base stations $gNB_1$ to $gNB_5$ may be connected, e.g. via the S1 or X2 interface or the XN interface in NR, with each other via respective backhaul links $116_1$ to $116_5$, which are schematically represented in FIG. 1B by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more of a system information block, SIB, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses.

For the uplink, the physical channels may further include the physical random-access channel, PRACH or RACH, used by UEs for accessing the network once a UE synchronized and obtained the MIB and SIB. The physical signals may comprise reference signals or symbols, RS, e.g. a positioning reference signal (PRS), a sounding reference signal (SRS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix, CP, length. A frame may also include of a smaller number of OFDM symbols, e.g. when utilizing a shortened transmission time interval, sTTI, or a mini-slot/non-slot-based frame structure comprising just a few OFDM symbols.

The wireless communication system illustrated in FIG. 1 may be any single-tone or multicarrier system using frequency-division multiplexing, like orthogonal frequency-division multiplexing, OFDM, or orthogonal frequency-division multiple access, OFDMA, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE- Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base stations $gNB_1$ to $gNB_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In a wireless communication network, like the one depicted in FIG. 1, it may be desired to locate a mobile UE with a certain accuracy, e.g., determine a position of the UE in a cell. Several positioning approaches are known, like satellite-based positioning approaches, e.g., autonomous and assisted global navigation satellite systems, A-GNSS, such as GPS, mobile radio cellular positioning approaches, e.g., observed time difference of arrival, OTDOA, and enhanced cell ID, E-CID, or combinations thereof.

It is noted that the information in the above section is only for enhancing the understanding of the background of the invention and, therefore, it may contain information that does not form conventional technology that is already known to a person of ordinary skill in the art.

SUMMARY

According to an embodiment, an apparatus for determining a position of an entity of a wireless communication network may have: a position determining processor to determine a position of a first entity of the wireless communication network using information about a set of measurements between the first entity and one or more second entities, wherein the first entity is a user equipment, UE, and wherein the one or more second entities are one or more transmission reception points (TRPs), and wherein, for each of the set of measurements between the first entity and one of the second entities, the second entity is to use a respective antenna pattern for transmitting a reference signal for the measurement on a respective positioning reference signal (PRS) resource of a PRS resource set, which PRS resource set is indicative of a plurality of PRS resources associated with respective resource identifiers, and wherein the first entity is to use an antenna pattern with an antenna pattern identifier for performing reference signal received power (RSRP) measurements and/or timing measurements on the PRS resources of the PRS resource set, wherein the antenna patterns are specific to an operation of antennas of the first and second entities using respective spatial filters for transmitting or receiving the reference signals, wherein the information about the measurement includes antenna pattern information about each of the antenna patterns used by the second entity for the set of measurements, wherein the measurement information indicates, for each of the antenna patterns used by the second entity for the set of measurements, a resource identifier associated with the PRS resource used for the respective measurement, and wherein the antenna pattern information includes, for each of the antenna patterns, information about a steering direction towards which the antenna pattern is directed, and further including information about a gain of the antenna pattern towards one or more predetermined directions, and wherein the first entity is configured for being provided with a configuration information for the measurements, the configuration information indicating a configuration of the PRS resources, wherein the position determining processor is configured to expect the first entity to use the same antenna pattern to measure the PRS resources of the PRS resource set.

According to another embodiment, a method for determining a position of an entity of a wireless communication network may have the steps of: determine a position of a first entity of the wireless communication network using information about a set of measurements between the first entity and one or more second entities, wherein the first entity is a user equipment, UE, and wherein the one or more second entities are one or more transmission reception points (TRPs), and wherein, for each of the set of measurements between the first entity and one of the second entities, the second entity is to use a respective antenna pattern for transmitting a reference signal for the measurement on a respective positioning reference signal resource of a PRS resource set, which PRS resource set is indicative of a plurality of PRS resources associated with respective resource identifiers, and wherein the first entity is to use an antenna pattern with an antenna pattern identifier for performing reference signal received power measurements and/or timing measurements on the PRS resources of the PRS resource set, wherein the antenna patterns are specific to an operation of antennas of the first and second entities using respective spatial filters for transmitting or receiving the reference signals, wherein the information about the measurement includes antenna pattern information about each of the antenna patterns used by the second entity for the set of measurements, wherein the measurement information indicates, for each of the antenna patterns used by the second entity for the set of measurements, a resource identifier associated with the PRS resource used for the respective measurement, and wherein the antenna pattern information includes, for each of the antenna patterns, information about a steering direction towards which the antenna pattern is directed, and further including information about a gain of the antenna pattern towards one or more predetermined directions, and providing the first entity with a configuration information for the measurements, the configuration information indicating a configuration of the PRS resources, wherein the method includes, in determining the position of the first entity, to expect the first entity to use the same antenna pattern to measure the PRS resources of the PRS resource set.

Another embodiment may have a non-transitory digital storage medium having a computer program stored thereon to perform the inventive method for determining a position of an entity of a wireless communication network, when said computer program is run by a computer.

BRIEF DESCRIPTION OF THE DRAWINGS

Embodiments of the present invention will be detailed subsequently referring to the appended drawings, in which.

DETAILED DESCRIPTION OF THE INVENTION

In the following, embodiments are discussed in detail, however, it should be appreciated that the embodiments provide many applicable concepts that can be embodied in a wide variety of wireless communication networks. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

Embodiments may refer to entities communicating with each other in a wireless communication system. Thus, implementations of the inventive concepts may include features implemented different entities (e.g. a user device, core entities, e.g. LMFs, base stations, TRPs, gNBs). Accordingly, features and functionalities and advantages described with respect to one type of entity may equivalently or similarly be applicable to another entity, although the description may not be explicitly repeated. E.g. features of an apparatus for determining the position of an entity may be applicable to a first entity or a second entity, e.g. a UE or a TRP.

Further, some of the described features may be implemented in multiple of the described concepts for communicating in a wireless communication system. Functionalities and advantages of a feature may apply described with respect to a specific aspect may equivalently or similarly apply to an implementation of the corresponding feature in the context of other aspects, although the description is not explicitly repeated.

Figure 1A:
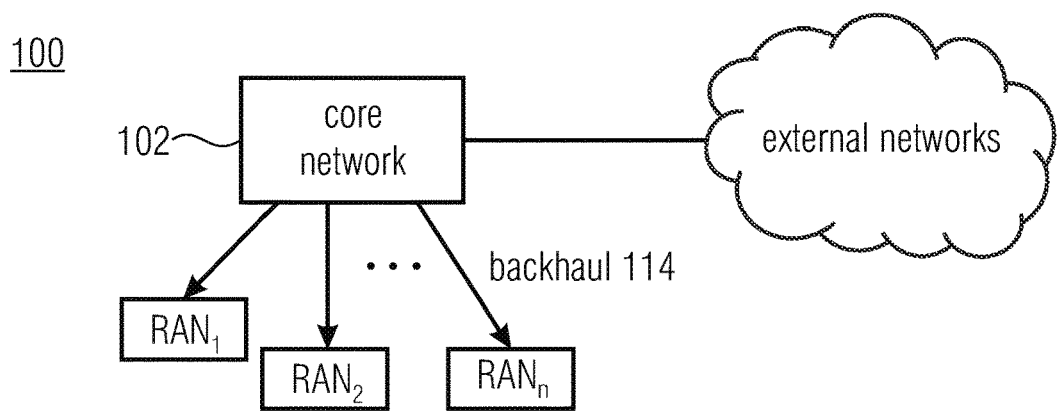
FIG. 1A, B illustrate an example of a terrestrial wireless network.
Figure 1B:
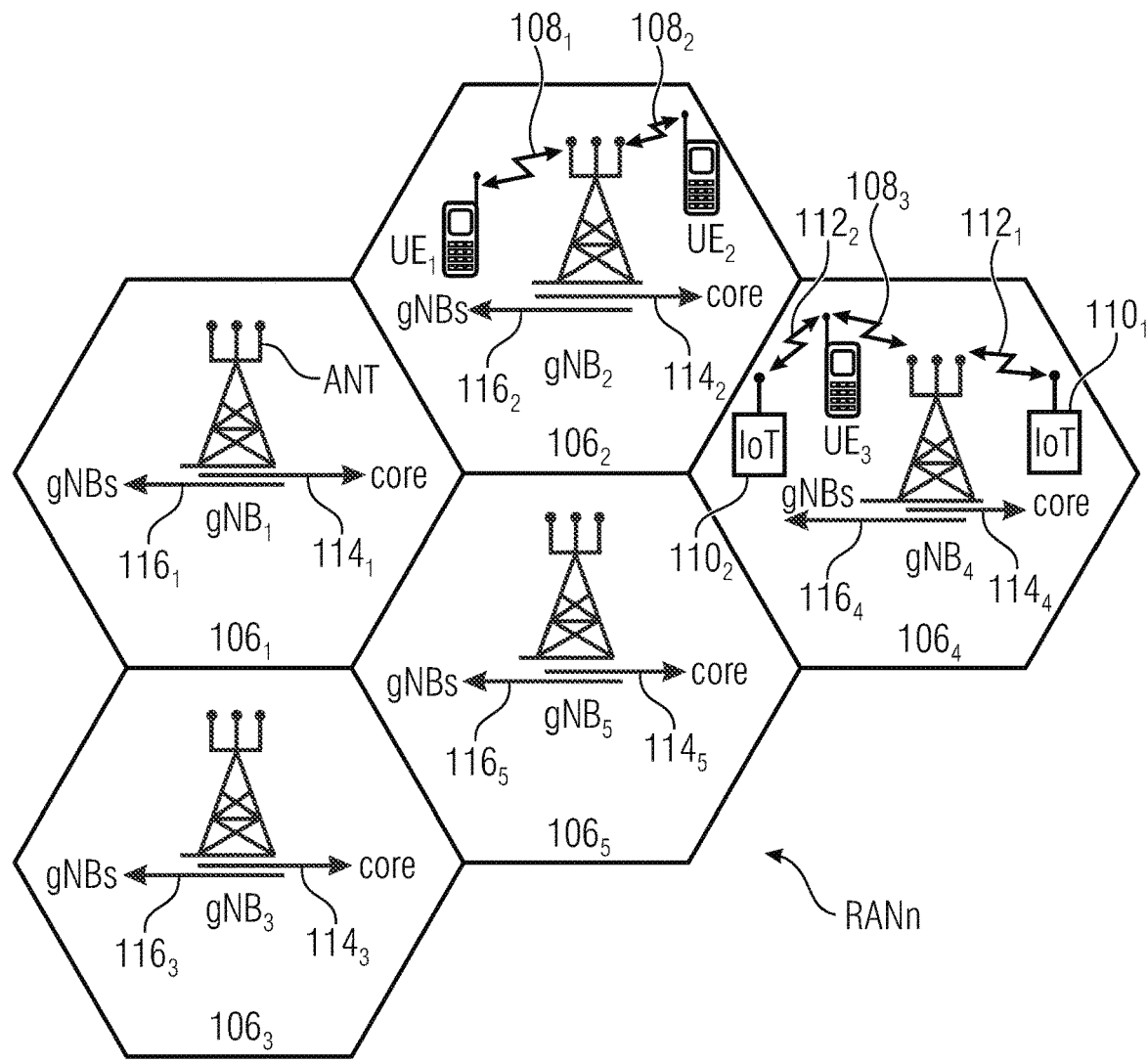
Figure 2:
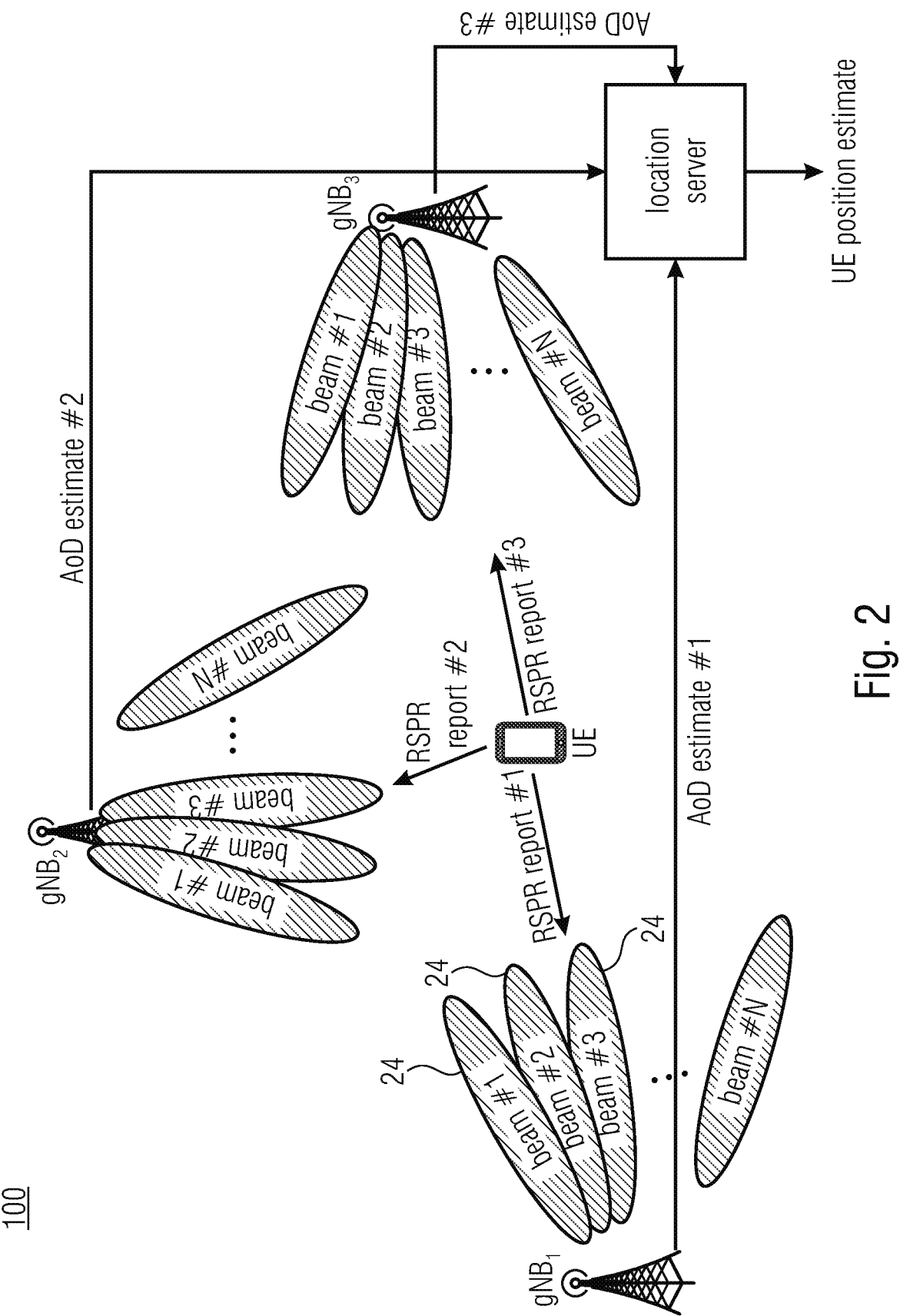
FIG. 2 illustrates examples of beams for reference signals in a wireless network, FIG. 3A, B illustrate two examples of antenna configurations of a UE, FIG. 4A, B illustrate examples of an antenna gain.

FIG. 2 illustrates a wireless communication network 100, e.g. like the one described with reference to FIG. 1. The network 100 of FIG. 2 includes base stations, gNBs, 1 to 3 which may be involved in computing the position of a UE. For determining the position of the UE, a gNB may use a plurality of beams 24, namely beams #1 to #N in FIG. 2. Each of the beams 24 may be associated with a respective antenna pattern for an antenna of a TRP of the gNB. The antenna pattern may refer to a pattern for driving antenna elements of the antenna resulting in a specific directional characteristic for transmitting a signal, or a pattern for reading out antenna elements of the antenna resulting in a specific directional characteristic for receiving a signal. In other words, each of the beams may represent a respective directional characteristic of an antenna. In the case of receiving a signal, the beam may be referred to as receive beam, being associated with a receive antenna pattern, and in the case of transmitting a signal, the beam may be referred to as transmit beam, being associated with a transmit antenna pattern. The illustrative representation of a beam 24 in FIG. 2 may represent a main lobe of the directional characteristic, or the radiation/detection pattern, of the antenna, which may point towards a boresight, also referred to as steering direction, of the directional characteristic associated with the beam 24.

For determining the position of the UE, a plurality of measurements between the UE and the gNB may be performed. For each of the measurements, a reference signal, e.g. a PRS, may be transmitted between the gNB and the UE, in either direction. For each of the measurements, the gNB may use one of the plurality of beams. For example, the gNB may use the plurality of beams for transmitting respective reference signals. The UE may perform measurements of the transmitted reference signals, the measurement e.g. including reference signal received power (RSRP). Alternatively, the UE may transmit a plurality of reference signals and the gNB may use the plurality of beams for measuring the reference signals. Also a combination of these two scenarios is possible. In other words, the gNB may perform a beam sweep for a position determination of the UE. Each of the reference signals may be transmitted using a respective radio resource. For example, the radio resources used for the plurality of measurements with the plurality of beams, e.g. the radio resources used for the beam sweep, may be part of a resource set, e.g. a resource set for a position measurement. The measurements may be used by the UE itself for determining its position, or the UE may report information about the measurements to a gNB, which may process the information and/or may forward the information to a location server, e.g. an LMF.

It is noted, that similar as described with respect to the gNB, also the UE may apply different antenna patterns, i.e. different beams, for transmitting or receiving different reference signals for the plurality of measurements between the UE and the gNB, e.g. as described with respect to FIG. 3 in section 1.3. In other words, in a wireless communication system or network, like the one described above with reference to FIG. 1, uplink and/or downlink methods for the localization or positioning of a user device, UE, may be employed. For example, uplink positioning methods such as uplink time difference of arrival (UL-TDOA) use a sounding reference signal (SRS) as the uplink reference signal for estimating parameters such as time difference of arrival (TDOA), round trip time (RTT), Angle of Arrival (AoA). Downlink Positioning methods use a positioning reference signal (PRS) as the downlink reference signal for estimating parameters such as downlink time difference of arrival (TDOA, DL-TDOA), Angle of Departure (AoD). Round trip time (RTT) is an approach that may rely on both DL and UL RSs. Both AoA and AoD may be employed for both uplink and downlink methods.

For example, for determining the position of a UE, the following classes of positioning methods according to 3GPP, Rel. 16 may be employed:

1. UE-assisted, LMF-based, where the positioning solution is computed at the LMF based on measurement reports from the UE.
2. UE-based, where the UE receives assistance data to run computation at the UE.
3. NG-RAN node assisted, where the positioning solution is computed at the LMF based on measurement reports from the NG-RAN node.

Embodiments of the invention address direction based estimation techniques in 5G. The AoD (angle of departure) or AoA (angle of arrival) procedures introduced in release 16 provide a rough estimation of the AoD or AoA. However, when considering realistic assumptions, the AoD estimation according to the current specification (3GPP NR Rel-16) fails to produce satisfactory results. The inventors realized, that the determination of the position may be improved by considering one or more of the following:

The TRP antenna configuration, beam characteristics and relation between the beams.

The UE antenna configuration, beam characteristics and relation between the beams and the different antenna panels at UE sides (panels with different orientations).

Unknown orientation of UE.

The channel characteristics.

To address the effects of the aforementioned reasons, the following solution is proposed:

In addition to the currently existing procedure, perform one or more of the following:
Report TRP beam characteristics
Report UE beam characteristics.
Provide UE assistance data to the NW including RSRP of a first arriving path and/or the RTD_b (relative time difference of beams) report.

1.1 TRP Antenna Configuration

According to the recent agreements in NRPPa (e.g. a communication interface between TRP and LMF), the TRP provides the LMF with NR-PRS beam information providing one or more azimuth angle information (e.g. the azimuth angle direction) and optional elevation angle information (e.g. the elevation angle direction). Table 1 shows examples of Information Elements, which may be communicated between TRP and LMF. M means mandatory and O means the field is optional. The representation in the Table 1 for the Information Element (IE) PRS angle Item allows associating finer angle-related information per beam, which can gives a finer resolution, or, in other examples, an estimation of the beamwidth associated with transmitting a PRS to the LMF.

TABLE 1

| IE/Group Name | Presence | Range | IE type and reference | Semantics description |
|---|---|---|---|---|
| NR-PRS Beam Information | | 1..< maxPRS-ResourceSets > | | |
| >PRS resource ID | M | | INTEGER (0..7) | The resource set in which the resources are associated with the angle. |
| >PRS Angle Item | | 1..< maxnoofAngleInfo > | | |
| >>NR PRS Azimuth | M | | INTEGER (0..359) | |
| >>NR PRS Azimuth fine | O | | INTEGER (0..9) | Fine angles |
| >>NR PRS Elevation | O | | INTEGER (0..180) | |
| >>NR PRS Elevation fine | O | | INTEGER (0..9) | Fine angles |
| LCS to GCS Translation | | 1 .. < maxnolcs-gcs-translation> | | Only the single value, 1, shall be used in this version of the specifications |
| >Alpha | M | | INTEGER (0..359) | |
| >Alpha-fine | 0 | | INTEGER (0..9) | Fine angles |
| >Beta | M | | INTEGER (0..359) | |
| >Beta-fine | O | | INTEGER (0..9) | Fine angles |
| >Gamma | M | | INTEGER (0..359) | |
| >Gamma-fine | O | | INTEGER (0..9) | Fine angles |

| Range bound | Explanation |
|---|---|
| maxPRS-ResourceSets | Maximum no of DL-PRS resource sets per TRP. Value is 2. |
| maxnoofAngleInfo | Maximum no of PRS angle information that can be included within NR-PRS Beam Information IE. Value is 65536 |
| maxnolcs-gcs-translation | Maximum no. of LCS-GS-Translation-Parameters that can reported with one message. Value is 3. |

In the example of Table 1, the information provided to the LMF does not include any antenna gain-related information to enable the more advanced direction estimation methods that use the beam characteristics information. One way to enhance the performance of the direction estimation is by interpolating between the beams. However, this can only be achieved if the beamwidth of all the interpolated beams are the same. Such an assumption is not reasonable for active antenna systems, which are common in 5G networks.

1.2 Channel Characteristics

For AoD method, Release-16 measurements are based on RSRP measurements. Despite the fact that adjacent (and overlapping) beams are expected to be correlated, transmit and receive beam pairs from the same UE and TRP can still experience different propagation conditions. This can lead, for example, to RSRP measurements from one or more beams to be in a NLOS condition (non line of sight). Based on the RSRP measurements, the network may not be able to identify these links.

The RSRP is defined as the linear average over the power contributions within the considered measurement frequency bandwidth. Even in a LOS condition, in the presence of multipath and in addition to shadowing and pathloss may cause that measured RSRP cannot accurately be mapped to a direction estimate.

1.3 UE Antenna Configuration and UE Orientation

The current procedure does not take into consideration UE antenna characteristics. Currently, the IE reported by the UE over LPP protocol to the LMF nr-DL-PRS-RxBeamIndex-r16 indicates only if the UE applies the same Rx spatial filter to the measured RSRPs for one more DL-PRS resources. It is not relevant for the current procedure whether the UE reports the RSRPs with the configurations illustrated in FIG. 3A or FIG. 3B. The major effect of the lack of this information is that the accuracy of the estimated AoD will not be accurate.

Figure 3A:
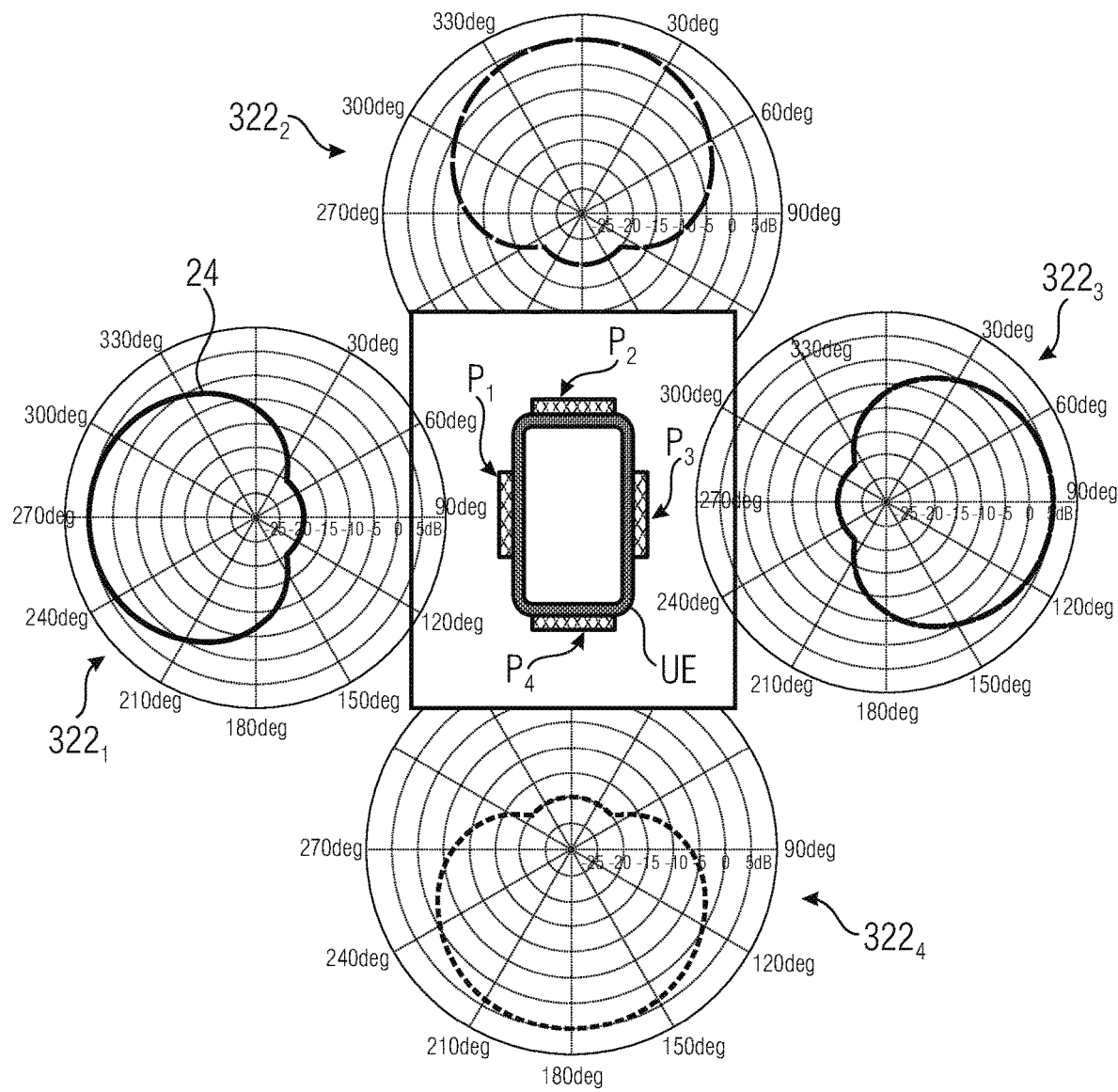
Figure 3B:
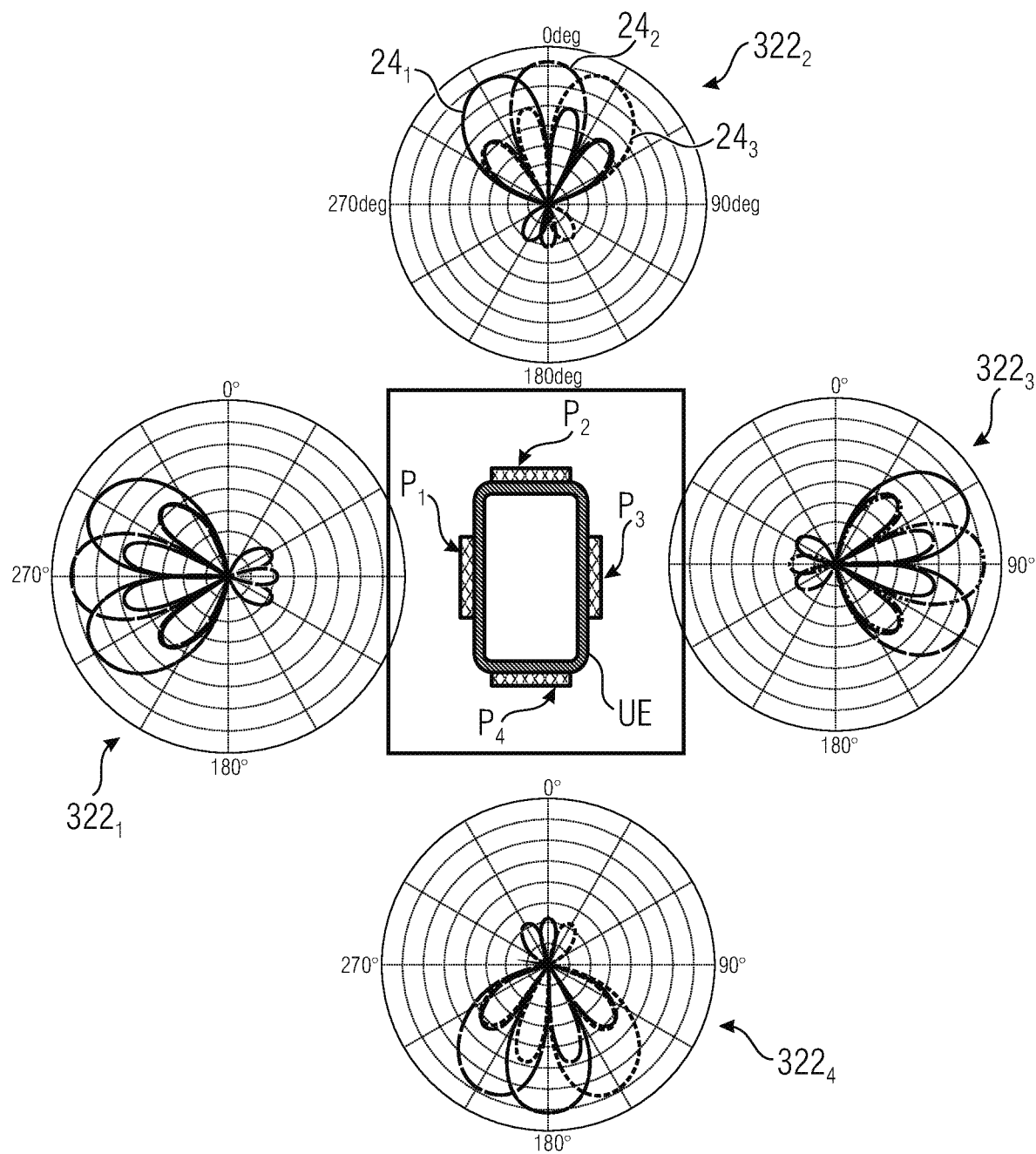

FIG. 3 illustrates two examples of antenna configurations for a UE with four panels $P_1$ to $P_4$, e.g. four antennas or antenna panels. FIG. 3 illustrates respective directional characteristics $322_{1-4}$ for the panels $P_{1-4}$ by means of azimuth cuts for an elevation of 2° of respective power per angle distributions. According to the configuration of FIG. 3A, the UE may apply one beam 24 (e.g. per polarization) per panel, while according to the configuration of FIG. 3B, the UE may apply three beams $24_{1-3}$ (e.g. per polarization) per panel.

The UE orientation is unknown to the NW, hence a direct use of the UE antenna settings can, in most cases, not directly be of use.

2. AoD Procedure According to NR Release 16

In this section, the procedure for AoD as enabled currently by Release 16 of 3GPP NR is provided.
DL-AoD Positioning (Sec 4.3.11 and 8.11 TS38.305 v16.1.0):

The DL-AoD positioning method makes use of the measured DL-PRS RSRP of downlink signals received from multiple TPs at the UE. The UE measures the RSRP of the received DL-PRS using assistance data received from the positioning server, and the resulting measurements are used along with other configuration information to locate the UE in relation to the neighboring TPs.

In the DL-AoD positioning method, the UE position is estimated solely based on DL-PRS RSRP measured at the UE of downlink radio signals from multiple NR TRPs, along with knowledge of the spatial information of the downlink radio signals and geographical coordinates of the TRPs.

The UE while connected to a gNB may need measurement gaps to perform the DL-AoD measurements from NR TRPs.

The DL-AoD procedure can generally be partitioned into three system nodes/functions: UE, TRP/gNB and the LMF.

Referring to the functionalities at the gNB, the gNB/TRPs/TPs may transmit one or more reference signals (for example, DL-PRS) with different Tx spatial filters (for example, through DL beam sweeping). For example, a Tx spatial filter may result in a specific transmit beam. As gNBs are aware of their spatial direction information (e.g. azimuth, elevation etc.) and the available DL-RS resources of the TRPs served by the gNB, lookup tables can be easily constructed by storing AoD values, and the measured received power associated with each beam. The gNB provides the LMF with the (collected) needed information to enable the LMF in order to derive/estimate the AoD.

In TS 38.214, it is mentioned that "the UE may be configured to measure and report up to 8 DL PRS RSRP measurements on different DL PRS resources from the same cell. When the UE reports DL PRS RSRP measurements from one DL PRS resource set, the UE may indicate that the DL PRS RSRP measurements associated with the same nr-DL-PRS-RxBeamIndex have been performed using the same spatial domain filter for reception."

In UE-assisted mode, the functionality of the LMF may be as follows: the information (spatial direction information (e.g. azimuth, elevation etc.) of the DL-PRS resources of the TRPs served by the gNB) provides information on the spatial direction information. Note that there are differences in the LMF function for UE-based and UE assisted modes of operation, cf., for example section 3.3.

An example of a DL-AoD procedure in accordance with Rel-16 may be summarized in the following steps:

gNB(s) transmit(s) reference signals with beam sweeping (gNBs are aware of the nominal beam direction only).

UE measures all transmit beams and reports reference signal received power (RSRP) back to the network (e.g. via the gNB) for all, e.g. up to 8, beams (per TRP) along with their beam indices. The UE may provide the network with information on which RSRPs corresponding to one TRP (within one resource set) were measured within the same RX spatial filter (i.e. at the UE).

gNB(s) report(s) the direction of the DL PRS beams to the LMF.

The location server calculates UE positioning estimate using one or more AOD estimate.

The procedure is illustrated by the communication paths illustrated in FIG. 2, which may represent an example of a DL-AoD procedure. It should be noted that in Rel-16 the UE can report the AoD measurements directly to the location server (or LMF) and the TRP (or gNB) provide the assistance information to the LMF where the AoD are computed at the LMF.

For AoA, the procedure is similar with a main difference that the UE transmits on or more SRS resources that are received by one or more TRP(s). The RSRP measurements are hence performed on the TRP side and provided to the network (LMF) for direction estimation.

Details of the procedure described in section 2 may be implemented in embodiments of the invention.

3. Embodiments of the Invention

According to embodiments of the invention antenna pattern information about a measurement between a first and a second entity is used for determining a position of a first entity, the antenna pattern information including information about an antenna pattern of the second entity and/or an antenna pattern of the first entity for the measurement between the first and the second entity.

In the following, embodiments according to invention are described, according to which antenna pattern information, used for determining a position of a first entity, includes information about a gain of an antenna pattern which is used by a second entity for a measurement between the first and the second entity.

Embodiments of the invention provide an apparatus (e.g. a positioning entity) for determining a position of a first entity, e.g. a UE, of a wireless communication network. As described before, the apparatus may, for example, be part of a UE (UE based mode) or a LMF (LMF based mode), or a TRP.

For example, the apparatus is provided in a core entity, like a Location Management Function, of a core of the wireless communication network, the core entity to receive the information about the one or more measurements (e.g. from the first entity and/or the one or more second entities and/or a service provider). In examples, the apparatus is provided in the first entity, e.g., a radio access network, RAN, entity or a user device, UE, of the wireless communication network, (e.g. the first entity to receive the antenna pattern information, e.g. information about the steering direction and the information about the gain, e.g. receive from one of the second entities, or a core entity or a service provider). In examples, the apparatus is provided in the one or more second entities, e.g., a radio access network, RAN, entity, or a transmission reception point, TRP, of the wireless communication network.

The apparatus comprises a position determining processor to determine a position of the first entity using information about one or more measurements between the first entity and one or more second entities (e.g. entities of known positions, e.g. a TRP). For one of the measurements between the first entity and one of the second entities, the first entity and the second entity are to use respective antenna patterns (i.e. beams), e.g. out of respective sets of antenna patterns for respective antennas of the first and second entity) for transmitting or receiving a reference signal for the measurement (e.g. the first and second entities comprise one or more antennas, wherein an antenna may comprise an antenna array, or antenna panel, having a plurality of antenna elements; e.g. the antenna pattern describes the transmission/reception pattern of the antenna used for transmitting or receiving the reference signal, wherein, e.g., the antenna pattern is specific to an operation of the antenna using a spatial filter for transmitting or receiving the reference signal). The information about the measurement comprises antenna pattern information (e.g. referred to as assistance information) about the antenna pattern used by the second entity for the measurement, the antenna pattern information comprising information about a steering direction (e.g. a boresight) towards which the antenna pattern is directed (i.e., e.g. using the antenna pattern, the antenna is directed towards the steering direction, i.e. a main lobe of a gain distribution of the antenna is directed towards the steering direction; the steering direction may be characterized by a direction and optionally a beam form indication, e.g. a width), and further comprising information about a gain (e.g. a level of the gain) of the antenna pattern towards one or more predetermined directions. Non-limiting, the first entity may be referred to as UE, and the second entity as TRP in the following.

Having information about the gain of the antenna pattern allows for determining the position of the UE by comparing a result of the measurement, such as a received power, to a further measurement which is the result of using another antenna pattern than that of the measurement. For example, a relation between the results of the measurement and the further measurement may be compared to, or matched to, a relation between the gains of the antenna pattern and the other antenna pattern for accurately determining the position of the first entity, e.g. by accurately determining a direction of the UE.

For example, the antenna pattern information indicates, for each of a set of directions, a respective gain of the antenna pattern. Each of the directions of the set of directions may be characterized by one or more angles, e.g. azimuth and/or elevation. Thus, each of the directions for which the antenna information indicates a gain may be understood as a predetermined direction. The antenna pattern information may include such information for each or a plurality of antenna patterns, using which a plurality of measurements may be performed, e.g. as described with respect to FIG. 2. In other words, wherein the antenna pattern information may be indicative of one or both of an azimuth angle and an elevation angle for indicating a direction out of the steering direction, the predetermined direction, and the below-threshold direction (see below).

According to embodiments, the predetermined direction points towards the direction of a side lobe of a gain distribution of the antenna pattern (i.e. a side lobe of an angular distribution of the gain of the antenna pattern) when the antenna pattern is directed towards the steering direction. At side lobe directions, an antenna may have significant gain, such resulting in a significant signal for a measurement, even if the direction from the UE to the TRP does not correspond to the steering direction. As different side lobes may have different gains, side lobe directions may result in very characteristic relations between measurement results.

According to embodiments, the antenna pattern information is indicative of a gain level for the steering direction and a gain level for the predetermined direction. Indicating the gain levels for the steering direction allows for accounting for different maximum gains of different antenna patterns.

Alternatively, the antenna pattern information is indicative of a relative gain level, e.g. a relative power level, between the steering direction and the predetermined direction. In other words, the gain for the predetermined direction, and optionally one or more further predetermined directions, may be indicated relative to a gain of the steering direction, i.e. relative to a maximum gain of the antenna pattern, as the gain is frequently maximum in the main lobe direction. Indicating the gain relative to the gain of the steering direction may allow for indicating the gain bit rate efficient.

According to embodiments, the position determining processor is to determine the position of the first entity using information about a plurality of measurements between the first entity and the one or more second entities. Accordingly, the information about the measurement may comprise antenna pattern information about respective antenna patterns used by the one or more second entities for the plurality of measurements, the antenna pattern information comprising information about respective steering directions of the antenna patterns, and further comprising information about a gain of the antenna pattern towards one or more predetermined directions.

According to embodiments, for each of the antenna patterns, the antenna pattern information is indicative of a relative gain level between the steering direction and the predetermined direction. According to alternative embodiments, wherein, for the predetermined direction, the antenna pattern information is indicative of a relative gain level between two of the antenna patterns.

According to embodiments, the antenna pattern information is indicative of one or more below-threshold directions at which the gain of the antenna, when directed towards the steering direction, is below a predetermined gain threshold (e.g. is zero). Having information about below-threshold directions renders measurements, for which no signal has been measured, usable for the position determination.

According to embodiments, e.g. as described with respect to FIG. 2, a predetermined resource (e.g. on which the measurement is performed) is associated with a resource identifier (e.g. PRS resource ID or SRS resource ID). The predetermined resource is part of a resource set which is indicative of a plurality of resources associated with respective resource identifiers. One or more or all of the resources of the resource set are associated with respective antenna patterns for the second entity (e.g. each of the resources is associated with a different antenna pattern to be used by the second entity for transmitting or receiving the reference signal using the respective resource. E.g. different antenna patterns for the second entity are associated with different antenna pattern identifiers, e.g. beam IDs).

According to embodiments, the first entity is provided with a configuration information for the measurement (e.g. a PRS configuration in the case that the first entity is to receive the reference signal, or a SRS configuration in case that the first entity is to transmit the reference signal), the configuration information indicating the predetermined radio resource.

According to embodiments, the reference signal for the measurement is transmitted using predetermined radio resources (which, e.g. are indicated in a configuration message, e.g. a PRS configuration message). The information about the measurement comprises measurement information which is indicative of a received signal strength (e.g. a RSRP value) measured for the predetermined radio resources. It is noted, that the information about the measurement may, in general, include information from a plurality of entities, e.g., the RSRP measured by the UE and the antenna pattern information, which may, in case of DL-AoD, be provided by the TRP.

According to embodiments, the position determining processor is to determine a signal strength relation (e.g. difference, ratio) between a value of the received signal strength for the measurement and a value of the received signal strength for a further of the measurements (which, e.g. is performed using a further antenna pattern which is different from the antenna pattern used for the measurement). The position determining processor is to evaluate a degree of a matching between the signal strength relation and a relation between a gain level for the predetermined direction for the measurement and a gain level associated with the further measurement. For example, the gain level associated with the further measurement refers to a gain of the further antenna pattern used for the further measurement (for transmitting or receiving the respective reference signal, which, e.g., corresponds to the antenna), in a steering direction of the antenna for the further measurement, or a predetermined direction, when the antenna pattern for the further measurement is directed towards a steering direction for the further measurement. For example, the steering direction of the further measurement differs from the steering direction of the measurement. Compare, e.g., FIG. 5 and description thereof.

According to embodiments, the apparatus is to use a validity information about a validity of the one or more measurements (e.g., for determining the position of the first entity), and the position determining processor is to selectively determine the position of the first entity using the one or more measurements in dependence on the validity information. For example, the validity information may indicate the one or more measurements to be valid or to be invalid.

For example, the measurements may be indicated to be invalid, if a position and/or orientation of the first entity, or a direction towards which the antenna for receiving the respective reference signals for the measurements changed during acquisition of the one or more measurements.

Figure 6A:
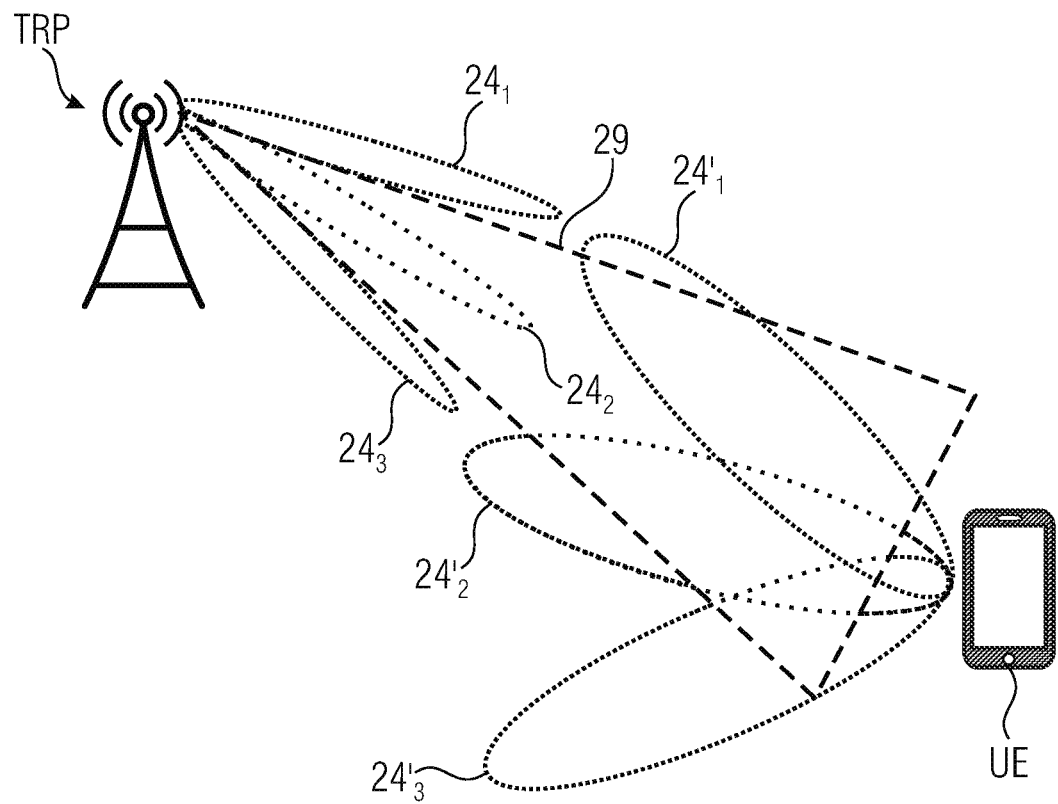

In other examples, the validity information may relate to the uncertainty region as described with respect to FIG. 6A. For example, the UE may be provided with the validity information, which may, according to these examples, include an information about a coarse position of the UE, e.g. in form of the uncertainty region. The UE may select, in dependence on the uncertainty region, a number of reference signals to be measured (or transmitted). For example, the UE may select reference signals which are associated with beams (of the TRP) which are directed towards a direction within the uncertainty region, and may omit the measurement (or transmission) of reference signals which are associated with beams which are not directed towards a direction within the uncertainty region. Thus, unnecessary measurements and related data load may be avoided. In other words, as reference signals associated with beams outside the uncertainty region are not expected to yield a valuable result, their measurement or transmission may be omitted on the basis of the validity information, which may indicate some of the measurements as invalid or valid. For example, in UE-based mode, the UE may compute the AoD. The UE may receive information (assistance data) on N PRS signals for the AoD determination. The LMF may know the UE coarse position and provides the UE with an expected AoD, i.e. an AoD where the PRS can be expected (i.e. the validity information). From the validity information and additional beam information (e.g. the antenna pattern information), the UE may select M PRS signals from the N PRS signal (i.e. downselecting or avoiding measuring the invalid PRS signals.

According to embodiments, in which the apparatus is provided in the core entity, the apparatus is to provide (e.g. to the first entity and/or the second entity) a configuration information for the measurement, the configuration information indicating the predetermined radio resource to be used for the measurement. Further, the apparatus is to receive the antenna pattern information (e.g. from the second entity performing the measurement, e.g., the antenna pattern information being about the antenna pattern being associated with the predetermined radio resource to be used for the measurement). Further, receive measurement information (e.g. from the one out of the first and the second entities which is to receive the reference signal; e.g. the measurement information being indicative of the received signal strength and/or the information about the relative times of arrival). In examples, the apparatus is to receive (e.g. from the first entity) information about the antenna pattern used by the first entity for transmitting or receiving the reference signal.

According to embodiments, in which the apparatus is provided in the first entity, the apparatus is to receive (e.g.

to the first entity and/or the second entity) a configuration information for the measurement, the configuration information indicating the predetermined radio resource to be used for the measurement. Further, the apparatus is to receive the antenna pattern information (e.g. from the second entity performing the measurement, e.g., the antenna pattern information being about the antenna pattern being associated with the predetermined radio resource to be used for the measurement).

According to embodiments, the first entity is to transmit the reference signal, and wherein the first entity is to receive measurement information (e.g. from the second entity which is to receive the reference signal; e.g. the measurement information being indicative of the received signal strength and/or the information about the relative times of arrival). According to alternative embodiment, the first entity is to receive the reference signal so as to obtain measurement information (e.g. the measurement information being indicative of the received signal strength and/or the information about the relative times of arrival).

According to embodiments, the information about the measurements comprises information about relative times of arrival (e.g. time of flight values) of the respective reference signals for two or more of the measurements (e.g., the two or more measurements being performed for two or more reference signal, the respectively used predetermined resources of which being associated with one resource set), e.g. as described in section 3.4. For example, the measure difference with other timing approaches measurements is to allow a reporting/procedure within the resources of a resource set. TDOA is a method that uses time difference but using the TOA difference of one resource from different resource sets from the different TRPs.

For example, the LMF can use the information (beam level, or gain) provided in method 1 (cf. section 3.2), and the UE RSRP, RTD_B measurements between two resources to identify a direction corresponding the main steering direction or the secondary "predetermined" direction, see also section 3.4.

According to embodiments, wherein the position determining processor is to determine, for a set of measurements between the first entity and one of the second entities, a time of flight or a time of arrival (e.g. a time of flight value, or a time of arrival value) of a first arriving path, FAP, (e.g. by determining the shortest time of flight beyond the set of measurements as the time of flight of the FAP), e.g. as described in section 3.4. According to these embodiments, the apparatus is to selectively consider a measurement of the set of measurements for the determination of the position of the first entity, if the time of flight or the time of arrival for the measurement is within a predetermined range around the time of flight or the time or arrival of the first arriving path (and, e.g. ignore the measurement for the determination of the position otherwise).

Further embodiments provide an apparatus, e.g. the first entity, e.g. a UE, e.g. as in FIG. 1, or FIG. 2, the apparatus being for communication in a wireless communication network. The apparatus may be referred to as UE in the following. The UE comprises one or more antennas for transmitting and/or receiving a radio signal (e.g. by using an antenna pattern for transmitting or receiving the radio signal). The UE is to transmit or receive respective reference signals for a set of measurements. The apparatus is to provide (e.g. to a core entity or a second entity) an acquisition information about the acquisition of the set of measurements.

According to embodiments, the UE is to detect a change of a position and/or an orientation of the apparatus during an acquisition of the set of measurements. Further, the UE is to provide a validity information (as the acquisition information) for the set of measurements in dependence on whether a change was detected or not. Alternatively or additionally, the UE is to provide an information (as the acquisition information) about a detected change of the position and/or the orientation (e.g. a direction and/or an amount of the change).

According to embodiments, the UE comprises a data storage holding information about characteristics of the one or more antenna patterns. The UE is to provide an information (as the acquisition information) about the antenna pattern used for receiving one or more or all of the set of measurements. For example, the UE is to apply one or more antenna patterns for the measurements, so as to steer one or more antennas towards the steering direction for the measurement.

Further embodiments provide an apparatus (e.g. one or the second entities, a TRP) for a wireless communication network, comprising one or more antennas for transmitting and/or receiving a radio signal (e.g. by using an antenna pattern for transmitting or receiving the radio signal). The apparatus may be referred to as TRP in the following. The TRP is to transmit and/or receive respective reference signals for one or more measurements, wherein the apparatus is to use at least one antenna pattern for transmitting or receiving the reference signal for at least one of the measurements, the antenna pattern for the measurement being directed towards a steering direction. Further, the TRP is to provide (e.g. to the positioning entity, which, e.g. is part of the TRP, or a core entity, or an another apparatus for the wireless communication network) antenna pattern information about the antenna pattern used for the measurement, the antenna pattern information comprising information about the steering direction towards which the antenna pattern is directed (i.e., e.g. using the antenna pattern, the antenna is directed towards the steering direction, i.e. a main lobe of a gain distribution of the antenna is directed towards the steering direction; the steering direction may be characterized by a direction and optionally a beam form indication, e.g. a width), and further comprising information about a gain (e.g. a level of the gain) of the antenna pattern towards one or more predetermined directions.

In the following, embodiments according to the invention are described, according to which antenna pattern information about an antenna pattern used by a first entity, e.g. a UE, for a measurement between the first and the second entity is used for determining a position of the first entity. For example, the first entity and the second entity may be the first and second entities according to the preceding embodiments.

Embodiments provide an apparatus, e.g. a positioning entity, for determining a position of an entity, e.g. a UE, of a wireless communication network. The apparatus comprises a position determining processor to determine a position of a first entity, e.g. a user UE, of the wireless communication network using information about a set of measurements between the first entity and one or more second entities, e.g. entities of known positions, e.g. a TRP. For one of the measurements between the first entity and one of the second entities, the first entity and the second entity are to use respective antenna patterns for transmitting or receiving a reference signal for the measurement, the antenna patterns being directed towards steering directions. The information about the measurements comprises antenna pattern information, e.g. first entity antenna pattern information, associated with respective antenna patterns used by the first entity for transmitting or receiving the respective reference signals for the measurements (e.g. of the set of measurements).

For example, the antenna patterns are out of respective sets of antenna patterns for respective antennas of the first and second entity. For example, the first and second entities comprise one or more antennas, wherein an antenna may comprise an antenna array, or antenna panel, having a plurality of antenna elements. For example, the antenna pattern describes the transmission/reception pattern or the directional characteristic of the antenna used for transmitting or receiving the reference signal, wherein, e.g., the antenna pattern is specific to an operation of the antenna using a spatial filter for transmitting or receiving the reference signal. The steering direction, for example, describes a direction towards which a main lobe of the antenna pattern is directed.

According to embodiments, for each of the set of measurements, the first entity is to use a respective (e.g. a different) antenna pattern.

According to embodiments, the apparatus is to determine a coarse position of the first entity using information about one or more coarse measurements between the first entity and the one or more second entities. Further, the apparatus is to determine, in dependence on the coarse position, a set of antenna patterns to be used by the first entity for the set of measurements. For example, each of the antenna configurations is indicative of an antenna and/or a corresponding steering direction to be used for the corresponding measurement.

According to embodiments, the antenna pattern information is indicative of one or more of antenna panel information (e.g., indicating relative positions and/or orientations and/or boresights of two or more antennas with respect to each other),
  steering direction information; For example, the steering direction information may indicate a relation between spatial parameters for two or more steering directions of an antenna (used for two or more of the measurements), e.g., indicating one or more of relative orientations and/or beamwidths and/or boresights and/or angle information. For example, the spatial-relation defines a relation between two reference signals. For example, the indication on the relation between the spatial filters may instruct the UE to
    receive on the R-x-spatial-filter it used to receive a second reference signal, or
    transmit on the Tx-spatial-filter it used to receive a reference signal (that means the Tx and Rx spatial filters are similar), or
    transmit on the Tx-spatial-filter it used to transmit a second reference signal),
  antenna characteristics information, for example, indicating, for one or more steering directions of one or more antennas, one or more of an orientation, a beam width, a boresight, angle information (e.g. dominant angle, average angle, power angular spectrum, transmit/receive channel correlation, transmit/receive beamforming, spatial channel correlation),
  antenna polarization information.

According to embodiments, wherein the apparatus is to receive an antenna information identifier (e.g. from the first entity), and to retrieve the antenna pattern information using the antenna information identifier (e.g., the apparatus comprises a data storage holding the antenna information, or the apparatus is to use the antenna information identifier to request the antenna information from a network entity).

According to embodiments, the apparatus is to detect a change of orientation of the first entity using the antenna information (and, e.g., to determine an amount and a direction of a detected change of orientation and to use the determined change of orientation in the determination of the position of the first entity).

According to embodiments, the apparatus is to use the antenna information to determine an orientation of the first entity.

According to embodiments, the apparatus is to use the antenna pattern information for at least two measurements to determine an orientation of the first entity, wherein respective steering directions used for the at least two measurements are different.

According to embodiments, the information about the measurements comprises information about a time of arrival or a time of flight of the reference signals for the measurements or a relative time of arrivals of two or more reference signals of two or more measurements.

According to embodiments, the information about the measurements comprises information about respective transmission powers of the measurements of the set of measurements.

According to embodiments, the information about the measurement comprises information about a steering direction towards which the beam is directed for the measurement (e.g., the steering direction may be characterized by a direction and a beam form or beamwidth indication, e.g. a width), and further comprises information about a gain (e.g. a level of the gain) of the beam towards a predetermined direction when the beam is directed towards the steering direction.

According to embodiments, the apparatus is to use a validity information about a validity of the one or more measurements for determining the position of the first entity. Further, the position determining processor is to selectively determine the position of the first entity using the one or more measurements in dependence on the validity information. For example, the validity information may indicate the one or more measurements to be valid or to be invalid. E.g., the measurements may be indicated to be invalid, if a position and/or orientation of the first entity, or a direction towards which the antenna for receiving the respective reference signals for the measurements changed during acquisition of the one or more measurements.

According to embodiments, the apparatus is to receive an information about a change of a position and/or an orientation of the first entity during an acquisition of the one or more measurements. Further, the position determining processor is to consider the information about the change of the position and/or the orientation in the determination of the position of the first entity.

According to embodiments, the apparatus is provided in one or more of
  a core entity, like a Location Management Function, of a core of the wireless communication network, the core entity to receive the information about the measurements (e.g. from the first entity and/or the one or more second entities and/or a service provider),
  the first entity, e.g., a radio access network, RAN, entity or a user device, UE, of the wireless communication network,
  the one or more second entities, e.g., a radio access network, RAN, entity, or a transmission reception point, TRP, of the wireless communication network (e.g. the second entity is to receive the (first entity) antenna panel information from the first entity).

Further embodiments provide an apparatus (e.g. the first entity, a user device, UE) for a wireless communication network, comprising one or more antennas for transmitting and/or receiving a reference signal. The apparatus may be referred to as UE in the following. The UE is to transmit or receive respective reference signals for a set of measurements, wherein the UE is to use at least one of the antennas for the set of measurements. The UE is to use respective antenna patterns for the measurements, the antenna patterns being directed towards respective steering directions.

According to embodiments, the UE is to use different antenna patterns (e.g. being directed towards different steering directions) for the set of measurements.

According to embodiments, the reference signals for the set of measurements originate from a common network entity and propagate towards a common direction.

According to embodiments, while receiving reference signals originating from and propagating to a fixed direction, the UE is to direct the antenna towards a plurality of steering directions for the measurements.

According to embodiments, the radio resources which are used for the reference signals for the set of measurements (e.g. the radio resources which are measured for receiving the reference signals or which are used for transmitting the reference signals) are associated with a reference resource set for which a network entity (e.g. a second entity, TRPs) is configured or preconfigured to direct one or more antennas of the network entity towards a predetermined steering direction for receiving or transmitting the reference signals. For example, the network entity is to transmit the reference signals and the apparatus is to receive the reference signals or vice versa. For example, the radio resources which are used for the reference signals for the set of measurements are associated with predetermined radio resources, which are associated with a predetermined antenna pattern to be used by a second entity to transmit or receive the reference signals.

According to embodiments, the UE is to provide antenna pattern information (e.g. assistance data) associated with respective antenna patterns used for the measurements.

According to embodiments, the UE comprises a data storage holding information about characteristics of the one or more antenna patterns, and is to provide an information (e.g. as the antenna information) about the characteristics of the respective antenna patterns used for the measurements.

According to embodiments, the antenna information is indicative of one or more of
- antenna panel information (e.g., indicating relative positions and/or orientations and/or boresights of two or more antennas with respect to each other),
- steering direction information (e.g., indicating a relation between spatial parameters for two or more steering directions of an antenna (used for two or more of the measurements), e.g., indicating one or more of relative orientations and/or beamwidths and/or boresights and/or angle information),
- antenna characteristics information (e.g., indicating, for one or more steering directions of one or more antennas, one or more of an orientation, a beam width, a boresight, angle information (e.g. dominant angle, average angle, power angular spectrum, transmit/receive channel correlation, transmit/receive beamforming, spatial channel correlation)),
- antenna polarization information.

According to embodiments, the UE is to transmit the reference signals for the set of measurements using a common transmission power.

According to embodiments, the UE is to provide information about a transmission power used for transmitting the reference signals for the set of measurements, or to provide information about respective transmission powers used for transmitting the reference signals for the transmission measurements (e.g. relative to each other, e.g. as a difference).

According to embodiments, the UE is to receive an indication of respective radio resources for the reference signals for the set of measurements.

According to embodiments, the antenna pattern information for a measurement is indicative of one or more of
- a steering direction towards which the antenna for the measurement is directed,
- a predetermined direction (e.g. a side lobe direction),
- a gain level for the steering direction and/or a gain level for the predetermined direction,
- a relative gain level between the steering direction and the predetermined direction.

According to embodiments, the UE is to receive the reference signals for the measurements. Further the UE is to determine, for one or more or all of the reference signals respective times of arrival, the UE is to provide information about the relative times of arrival of the reference signals.

In the following, further details and features are described, which may optionally and individually be combined with the above-described embodiments.

Definitions

The following definitions may optionally apply for the respective terms used within this disclosure, in particular for any of the embodiments of the invention.

Positioning entity: is an entity that computes a UE position. This can be a network entity such as the LMF, local LMF, a location server, or a TRP. The positioning can be estimated in UE-based mode by the UE itself. The apparatus for determining a position of an entity may, for example, be a positioning entity.

DL-PRS resource and resource set: A DL-PRS resource set is defined as a set of DL-PRS resources where each resource has a DL-PRS resource ID. The DL-PRS resources in a DL-PRS resource set are associated with the same TRP or frequency layer. Each DL-PRS Resource ID in the DL PRS resource set can be associated with a specific beam. A TRP may be configured with multiple PRS resource sets.

For example, in TS 38.214 section 5.1.6.5, the resource set and resource defined a PRS are provided as follows: The UE expects that it will be configured with dl-PRS-ID-r16 each of which is defined such that it is associated with multiple DL PRS resource sets from the same cell. The UE expects that one of these dl-PRS-ID-r16 along with a nr-DL-PRS-ResourceSetId-r16 and a nr-DL-PRS-ResourceId-r16 can be used to uniquely identify a DL PRS resource.

A PRS resource configuration may include one or more or all of the following: PRS resource ID, Resource Mapping, Periodicity, Resource Repetition factor, Time Slot Offset, Frequency resource element offset, Sequence ID, Comb size, Resource Bandwidth, Resource Power.

SRS resource and resource set: The configuration of the SRS is determined by the RRC resource set and resources, and characterized by an information element "SRS Config" including the List of Resources (max 64 resources) and Resource Sets (max 16 resources). The maximum number of supported SRS resource sets for positioning is a UE capability, with configurability of up to 16 resource sets per BWP. Values for the UE capability include {1,16}.

For example, a SRS Resource Set may include at least one of the following parameters: SRS resources list within the Set, Triggering Types for resources within a Set (Periodic, SP: Semi-Persistent, Aperiodic), Power Control parameters (Alpha, P0 value, reference signal used path loss determination). A SRS Resource may include at least one of the following: SRS resource ID, Time and frequency resource mapping, SRS Spatial Relation Information. In an embodiment, the transmitted reference signal can be a reference signal transmitted within a PRS resource or an SRS resource. In other words, the reference signal may be a down-link or an up-link reference signal.

Uplink Spatial Relation Definition:

For example, a UE can be configured with up to 16 SRS resource sets depending on the UE capability. Each resource set can be configured with up to 16 resources. On these resources, a UE can be also configured with spatial relation information by the network, to assist the UE on using the same Rx spatial filter (receiving beam) used to receive a DL signal for the transmission the configured SRS resource. The same also applies for UL, where a spatial relation information can be provided with another SRS ID. The spatial relation information for positioning (SpatialRelationInfoPos) are configured on a resource level in [3GPP TS38.331].

In an embodiment, a reference signal transmitted in a SRS resource includes a spatial relation configuration indicating a spatial relation with another downlink or uplink reference signal.

Spatial QCL Definition

The QCL is an indication for the UE from the network on how to group the reference signals with similar (large scale) channel properties.

Two antenna ports are said to be quasi co-located if properties of the channel over which a symbol on one antenna port is conveyed can be inferred from the channel over which a symbol on the other antenna port is conveyed.

The network can indicate a QCL type:
QCL-TypeA: Doppler shift, Doppler spread, average delay, delay spread
QCL-TypeB: Doppler shift, Doppler spread
QCL-TypeC: Average delay, Doppler shift
QCL-TypeD: Spatial Rx parameter In an embodiment, a reference signal transmitted in a PRS resource includes a QCL indication with another downlink reference signal.

3.1 Example Procedures

In this section, an example method for determining a position of a UE according to embodiments of the invention is described. Features and details described in sections 3.2, 3.3 and 3.4 may optionally be implemented in the herein descried method. The method comprises one or more or all of the following steps:
1. Measure RSRP from more than one DL-RS resource using one or more UE Rx spatial filters (or UL-RS using one or more UE Tx spatial filters), e.g. as described in section 3.2 or 3.3, in particular method 2.1 of section 3.3:
   a. Option1: instruct the UE to perform Tx/Rx sweeping around the resources corresponding to the DL-resource with the strongest measured received power, or through an indicated spatial relation filter (SRS, PRS, or SSB).
   b. Option2: the UE informs the network on the measurements performed with an antenna port, or the beams that have the same QCL type-D or C characteristics.
2. Acquire measurements (for example: RSRP and/or RTD_B; RTD_B: is the relative time difference between different beams explained in Method 3: section 3.4)
   a. Measurements performed by UE in UE-assisted mode reported to the LMF (over LPP).
   b. Measurements performed by UE in UE-based mode (no measurement report is mandatory).
   c. Measurements performed by TRP in AoA method and reported to LMF (over NRPPa).
3. Optionally: receive information from TRPs on the beam including the beam direction and gain of the main lobe and for the relevant side lobes (i.e., side lobes with relatively high power), e.g. as described in section 3.2. Report direction information such as:
   NR PRS Azimuth coarse
   NR PRS Azimuth fine
   NR PRS Elevation coarse
   NR PRS Elevation fine
   Beam level information:
   NR PRS Azimuth coarse level
   NR PRS Azimuth fine level
   NR PRS Elevation coarse level
   NR PRS Elevation fine level
4. Optionally: Receive UE information on antenna characteristics (e.g. as in section 2.3.2)
   i. For the DL measurements, the UE reports for each PRS resource set at least one of the following information on the Rx spatial filter:
   Report direction information such as:
      NR PRS Azimuth coarse
      NR PRS Azimuth fine
      NR PRS Elevation coarse
      NR PRS Elevation fine
   Beam level information:
      NR PRS Azimuth coarse level
      NR PRS Azimuth fine level
      NR PRS Elevation coarse level
      NR PRS Elevation fine level
   ii. For the UL-RS transmitted by the UE reports for each SRS resource set at least one of the following information on the Tx spatial filter:
   Report direction information such as:
      NR PRS Azimuth coarse
      NR PRS Azimuth fine
      NR PRS Elevation coarse
      NR PRS Elevation fine
   Beam level information:
      NR PRS Azimuth coarse level
      NR PRS Azimuth fine level
      NR PRS Elevation coarse level
      NR PRS Elevation fine level
5. Use the information in steps 1, 2, 3 (if provided) and/or 4 (if provided) to estimate the direction of arrival and estimate a UE position. Optionally: combine the information in 4.i and 4.ii for combined AoA and/or AoD estimation.

3.2 AoD Enhancement by Providing the LMF with Beam Level Information

For example, the herein described method may be implemented by apparatus described in the general part of section 3, e.g. by embodiments in which the measurement information, in particular the antenna pattern information is provided to the LMF, and the reference signal is transmitted by the TRP using a respective antenna pattern for a plurality of measurements, the UE measuring received signal strength.

Figure 4A:
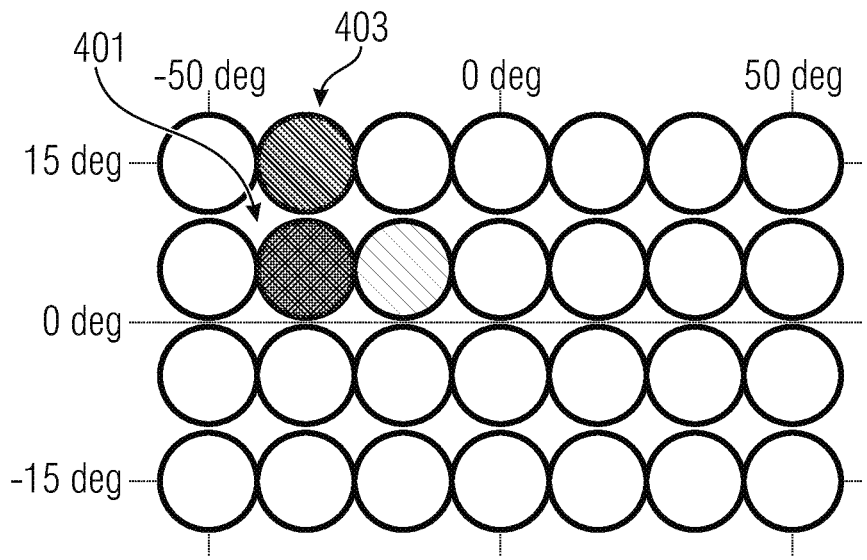
Figure 4A:
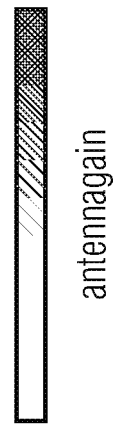
Figure 4B:
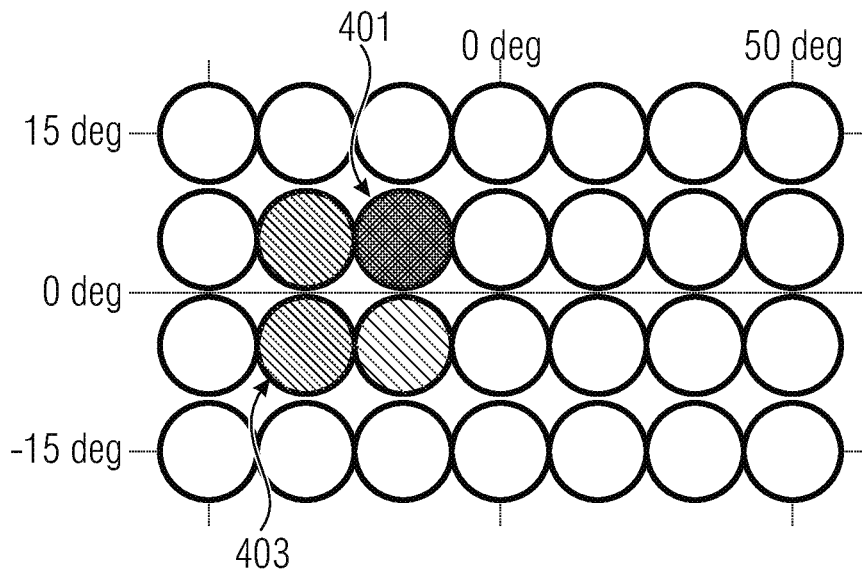
Figure 4B:
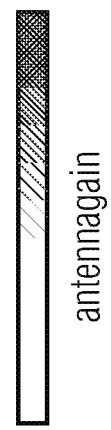

FIG. 4 illustrates, in FIGS. 4A and 4B, respectively, examples of an antenna gain for two Tx Beams from the same source (e.g. the same antenna) having a main lobe 401 and side lobes 403 at different azimuth, elevation angles. The directions of the main lobe 401 and the side lobe 403 differ in the two examples of FIG. 4A and FIG. 4B. Similarly, the pattern or distribution of a receive beam may differ for different directions of main lobes of the receive beams.

Method 1:

Consider a UE with a valid LOS link to one or more TRP(s). For example, if a TRP transmits two PRS resources (i.e. two reference signals on respective resources) with azimuth and elevation scanning angles of −30° and 7°, respectively, for PRS resource 1; and −15° and 7° for PRS resource 2. Due to beamforming using multiple antenna elements within an antenna array, side lobes can have significant power compared to the main lobe. Depending on the Tx/Rx characteristics, the TRP and UE antenna orientations, the contribution of the side lobes on the received signal power is not known and hence a measurement on the received signal power such as RSRP cannot be directly mapped to the direction estimation.

[see, e.g., state of the art related to method 1] When using the direction information from multiple resources in different known directions, a positioning entity such as an LMF or a UE is able to narrow down the direction estimate, and possibly provide a more accurate estimate. In this example, assuming the UE is relative to the TRP in Azimuth direction of −10°. The RSRP contribution from resource 2 can be higher than that from resource 1. Hence, the direction estimation can assume that the UE is within the beam range defined within resource 2. The more resources with different scanning angles configured, the better the granularity of the direction estimation technique. However, increasing the number of resources means high computational complexity, and more relevant is that number of resources utilizing the air interface will increase massively. It is worth noting that providing side-lobe direction information helps in resolving ambiguity when multiple directions are possible. However, the contribution to the directional estimation accuracy is minimal.

If the TRP can provide information on Tx/Rx beam direction and level, then the positioning entity can map the measurements from the multiple PRS resources with the known information on the beam characteristics (beam level and direction).

Since the number of PRS resources transmitted over multiple beams can be high (especially for high frequencies), using the complete beam direction and level information may cause high signaling overhead and high computational complexity to the positioning entity. It is also possible that the positioning entity estimates a wrong direction based on the multiple beam lobes candidate combinations.

In one option, the positioning entity can limit or reduce the search space based on coarse direction estimate derived from the strongest RSRP or additional UE measurements (example first arriving beam). The positioning entity may indicate the coarse direction to a certain TRP, where the TRP may activate finer beams for fine AoD measurements in the indicated coarse direction where each beam is associated with a PRS ID. The TRP provides the positioning entity with the beam direction and level information from each used PRS ID.

UE Procedure 1: The UE is indicated by the network to perform measurements on a set of PRS resources. The network may indicate to the UE which PRS resources or PRS resource sets can be measured using the same Rx spatial filter (for example by a QCL indication).

Direction estimation: the position entity searches for the matching level differences using the additional beam information. The positioning entity may limit the search within the coarse direction.

UE Procedure 2: The UE is not expected to use different spatial filters for measuring PRS resources corresponding to the same PRS resource set. The UE is not expected to use different spatial filters for measuring PRS resource sets if a QCL-type D indication is signaled from the network.

The UE may use different Rx spatial filters if the relation between the used Rx spatial filters is known to the network.

In one embodiment, the UE signals to the network an indication on the validity of the PRS measurements for direction estimation. This indication can be related to a change in position and/or orientation during an AoD or AoA procedure.

In one embodiment, the UE signals to the network an indication on orientation and/or movement change of the UE during PRS measurements for direction estimation over multiple time instants.

Reported Beam Characteristics

The reported beam characteristics may include one or more of the following, in addition to the main lobe(s) direction information Level of the main lobe (i.e., angle at which the radiation power reaches a maximum, e.g. global maxima) and level of the most dominant side lobe(s) (i.e., local maxima).

The relative level between the main lobe gain and the most dominant side lobe(s).

The angles of the nulls (i.e., the angles at which the radiated power falls to zero).

The Tx/Rx beam information for a TRP can be determined either by antenna measurements or simulation. In either case, the beam information is an offline data known at the TRP or by a service provider.

The LMF can request from the TRP the information to be reported. For example, the power level in a given direction.

An example for the Tx beam information (e.g. antenna pattern information) provided from the TRP to the LMF over NRPPa corresponding to an AoD method using PRS resource ID or an AoA method using SRS resource ID is provided in the tables below.

| IE/Group Name | Presence | Range | IE type and reference | Semantics description |
|---|---|---|---|---|
| NR-PRS Beam Information | | 1 .. < maxPRS-ResourceSets > | | |

| IE/Group Name | Presence | Range | IE type and reference | Semantics description |
|---|---|---|---|---|
| >PRS resource ID | M | | INTEGER (0..7) | The resource set in which the resources are associated with the angle. |
| >PRS Angle Item | | 1..< maxnoofAngleInfo > | | |
| >>NR PRS Azimuth | M | | INTEGER (0..359) | |
| >>NR PRS Azimuth fine | O | | INTEGER (0..9) | Fine angles |
| >>NR PRS Elevation | O | | INTEGER (0..180) | |
| >>NR PRS Elevation fine | O | | INTEGER (0..9) | Fine angles |
| >>NR PRS Azimuth level | O | | INTEGER (0..359) | |
| >>NR PRS Azimuth fine level | O | | INTEGER (0..9) | |
| >>NR PRS Elevation level | O | | INTEGER (0..180) | |
| >>NR PRS Elevation fine level | O | | INTEGER (0..9) | |

| IE/Group Name | Presence | Range | IE type and reference | Semantics description |
|---|---|---|---|---|
| NR-SRS Beam Information | | 1 .. < maxSRS-ResourceSets > | | |
| TRP Rx beam ID | M | 1 .. < maxTRPBeam> | | |
| >SRS resource ID | O | | INTEGER (0..7) | The resource set in which the resources are associated with the angle. |
| >PRS Angle Item | | 1..< maxnoofAngleInfo > | | |
| >>NR PRS Azimuth | M | | INTEGER (0..359) | |
| >>NR PRS Azimuth fine | O | | INTEGER (0..9) | Fine angles |
| >>NR PRS Elevation | O | | INTEGER (0..180) | |
| >>NR PRS Elevation fine | O | | INTEGER (0..9) | Fine angles |
| >>NR PRS Azimuth level | O | | INTEGER (0..359) | |
| >>NR PRS Azimuth fine level | O | | INTEGER (0..9) | |
| >>NR PRS Elevation level | O | | INTEGER (0 .. 180) | |
| >>NR PRS Elevation fine level | O | | INTEGER (0..9) | |

In the following, an example of an AoD procedure is described by the non-limiting example of a DL-AoD Method, under the non-limiting working assumption that a TRP is aware of its antenna pattern and beam gains.

1—Configuration: The UE receives a configuration message on the DL-PRS configuration (from the Network: LMF)

2—Measurements: The UE performs the RSRP or/and timing measurements for NPRS resources within one PRS resource set on an UE Rx spatial filter with an Rx spatial filter ID
 a. The UE is expected to use the same spatial filter to measure a PRS resource if QCL-type D parameter is configured with configured with an indication to a DL different reference signal.

3—Measurement Reporting:
 a. In UE-based mode: the UE does not report the measurements
 b. In UE-assisted mode: the UE reports the RSRP measurements for each measured PRS resource ID with an Rx beam index indication to the LMF 4—Assistance Information:
 a. The TRP (with TRP-ID) associate the antenna patterns that contains the beam gain and direction information with the DL-PRS resource ID transmitted by this TRP. The TRP provides this information to the positioning entity (LMF or UE).
 b. The UE may provide assistance information to the LMF on its Rx-Beam ID in UE-assisted mode Table 2 shows examples of beam gain difference between reference beam (e.g. the ones with zero difference) and its adjacent beams.

5—Processing
   a. The positioning unit uses the measurements to identify the dominant DL beam(s) (beam(s) received with the highest power)
   b. The positioning unit compares the received power values of the adjacent beams with respect to the dominant (or reference) beam
   c. If the cumulative sum of the received power on one side of the reference beam is greater than that of the other side, then the positioning entity uses this information to restrict the possible AoD of a given UE to the side with the most cumulative power with respect to the reference beam.
   d. Since the UE also reports the Rx spatial filters it used to receive the reference beam and the characteristics of the UE beam patterns associated with such spatial filters, a more accurate AoD can be estimated.
   Example:
      i. Compare and report difference between max gain of reference beam (e.g., beam $24_1$ in FIG. 5) with respect to adjacent beams (e.g., beams $24_2$ and $24_3$ in FIG. 5). The beam level gain for each direction is indicated by the horizontal dotted blue lines.
      ii. Compare and report the difference in gain between the reference beam with respect to the adjacent beam at a given beam direction (indicated by the vertical dotted line 28 in FIG. 5).

TABLE 2

|  | PRS-1 | QCL-type D with PRS-1 ||||| QCL-type D with PRS-6 ||||
|  |  | PRS-2 | PRS-3 | PRS-4 | PRS-5 | PRS-6 | PRS-7 | PRS-8 | PRS-9 | PRS-10 |
|---|---|---|---|---|---|---|---|---|---|---|
| Rx beam-1 | 0 | 0.581 | 0.283 | 0.167 | 0.116 | 0.283 | 0.178 | 0.068 | 0.458 | 0.343 |
| Rx beam-2 | 0.075 | 0.392 | 0.677 | 0.121 | 0.406 | 0.338 | 0.285 | 0.053 | 0 | 0.309 |
| Rx beam-3 | 0.837 | 0.482 | 0.491 | 0.136 | 0.355 | 0.285 | 0.398 | 0.285 | 0 | 0.237 |

Figure 5:
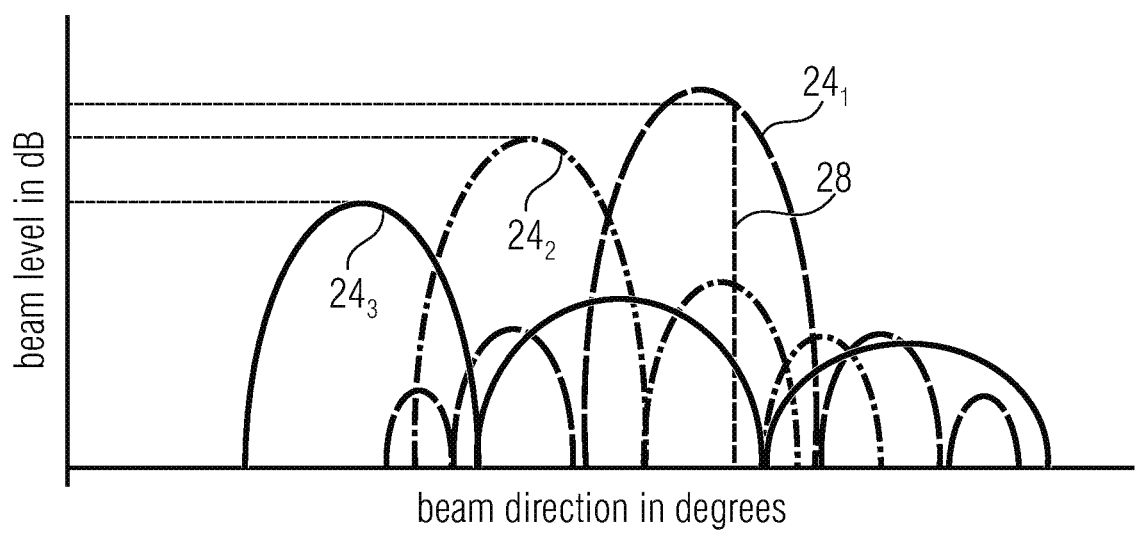
FIG. 5 illustrates examples of directional characteristics of three beams, FIG. 6A, B illustrate examples of beams of a TRP and a UE.

FIG. 5 shows a diagram illustrating exemplary directional characteristics of three beams $24_{1-3}$. For example, the positioning entity may consider a relation between the gains of the beams, so as to identify a specific direction 28 for which the relation is characteristic.

3.3 Use of UE Beam Information to Produce a More Accurate AoD/AoA Estimate

For example, the herein described method may be implemented by the apparatus described in the general part of section 3, e.g. by embodiments in which the measurement information includes antenna pattern information about the antenna pattern used by the UE.

For AoD, the UE can—according to the current procedure, inform the network if the DL-PRS resources are measured with the same RX spatial filter. This information means that the UE uses a single Rx spatial filter. This way, the positioning entity can use this information for same AoD estimate. For AoA, the UE is informed by higher layers with spatial relation information which the UE use to choose a Tx spatial filter for UL transmission. The UE beam configuration, the relation between the UE beams within an antenna panel, or the relation between two different panels are not provided to the network.

General Procedure (Method 2)

In DL AoD, the network configures the UE over higher layer signaling to perform AoD measurements (like RSRP or/and timing measurements) with different Rx spatial filters using the same PRS ID. The UE provides the network with additional assistance data including information on Rx spatial filters used for one AoD measurement.

In UL AoA, the network configures the UE over higher layer signaling to transmit a reference signal such as sounding reference signal (SRS) with different Rx spatial filters using the same SRS resource ID. The UE provides the network with additional assistance data including information on Tx spatial filters used for an SRS transmission.

Acquiring the UE Beam Information

Since different UE vendors may implement UE antenna panels differently, a common characterization based on common antenna configuration like the number of antenna elements and beam virtualization cannot be defined. The UE antenna radiation pattern is normally measured to characterize the transmission behavior with different configurations over all the UE antenna panels.

In one option, the UE can be provided with the Rx-Tx beam information (for example as a LUT). The UE then provides the network with assistance data based on the known information and the associated Rx beam within a DL PRS-ID or a Tx beam within an UL SRS ID.

In a second option, the UE can be configured for specific usage (e.g., Positioning usage) with defined Rx or Tx configurations. For these specific configurations, it is assumed that the network is aware of the beam information at the UE. This information can be derived at the network based on assistance information from the UE (e.g., Positioning-Beam-Identifier) which is decided by the UE based on a spatial relation configuration or based on the UE configured reception and transmission settings. The network can inform the UE to maintain or update specific configuration settings using this identifier.

Types of Assistance Data

The UE can indicate to the network assistance data with information related to the Tx or Rx spatial filters used. The choice of the needed assistance information depends on the approach the positioning entity takes, or the configuring network and the UE capabilities in supporting the needed information.

The UE indicates to the network additional information related to the antenna characteristics used for the RSRP measurements, these may include:
   1. Antenna panel related information:
      Example: an antenna panel ID, or an integer indicating the beams corresponding to the same or different antenna panels
      One piece of information may be to provide the network with relation of the Rx beams (or Tx beams in UL) that a UE Rx spatial filter (or an SRS resource ID in UL) which could correspond to the same UE antenna panel and may be associated with the same AoD positioning measurement (or AoA in UL). Such information is especially valuable in case of multi-panel UEs transmitting uplink positioning RSs or measuring on downlink positioning RSs concurrently.

Relation between antenna panels, which can be related to the physical placement of the antenna panels on a device or related to the direction of the antenna plane or antenna boresight.

2. Relation between Tx/Rx beams:

Since antenna panels are not explicitly defined in the standard, the information provided by the UE can include the relation between two different spatial filters, corresponding to one or more of the following:

UE spatial Tx parameter between two or more UL-RS resource (or resource set) IDs.

UE spatial Rx parameter between two or more DL measurements RS resource (or resource set) IDs.

Angle information (such dominant angle, average angle, AoA/AoD power angular spectrum, transmit/receive channel correlation, transmit/receive beamforming, spatial channel correlation etc.)

3. Information related to beam characteristics

To enhance direction estimation accuracy and support advanced methods. The UE may provide the network or LMF in UE-assisted mode with one or more of the following information:

Rx beam index corresponding to the same UE antenna panel.

Panel orientation in combination with the above information to identify related AoD/AoA measurements.

Main lobe HPBW (half power beamwidth).

Antenna gain or radiation Intensity of the main lobe.

Relative radiation intensity for side (minor) lobes w.r.t. to main lobe.

SLL (sidelobe level) for one or more sidelobes.

Scan angle or orientation w.r.t. to a RS (DL PRS or UL SRS).

RSRP difference on the different beams.

Validity of measurements (example by change of UE orientation).

4. Polarization Information used for the measurements:

Indication if the measurements corresponding to the same DL-RS ID are performed using combined information from dual polarized antenna Optional polarization type: (cross-polarized antennas, circular, H/H polarization)

Indication if the measurements corresponding to the same DL-RS ID are performed by two different polarizations Optional polarization type: (cross-polarized antennas, circular, H/H polarization)

Indication if the transmission is performed by two different polarizations

Optional polarization type: (cross-polarized antennas, circular, H/H polarization)

Method 2.1 AoD/AoA Enhancements Using Basic UE Antenna Information

Figure 6B:
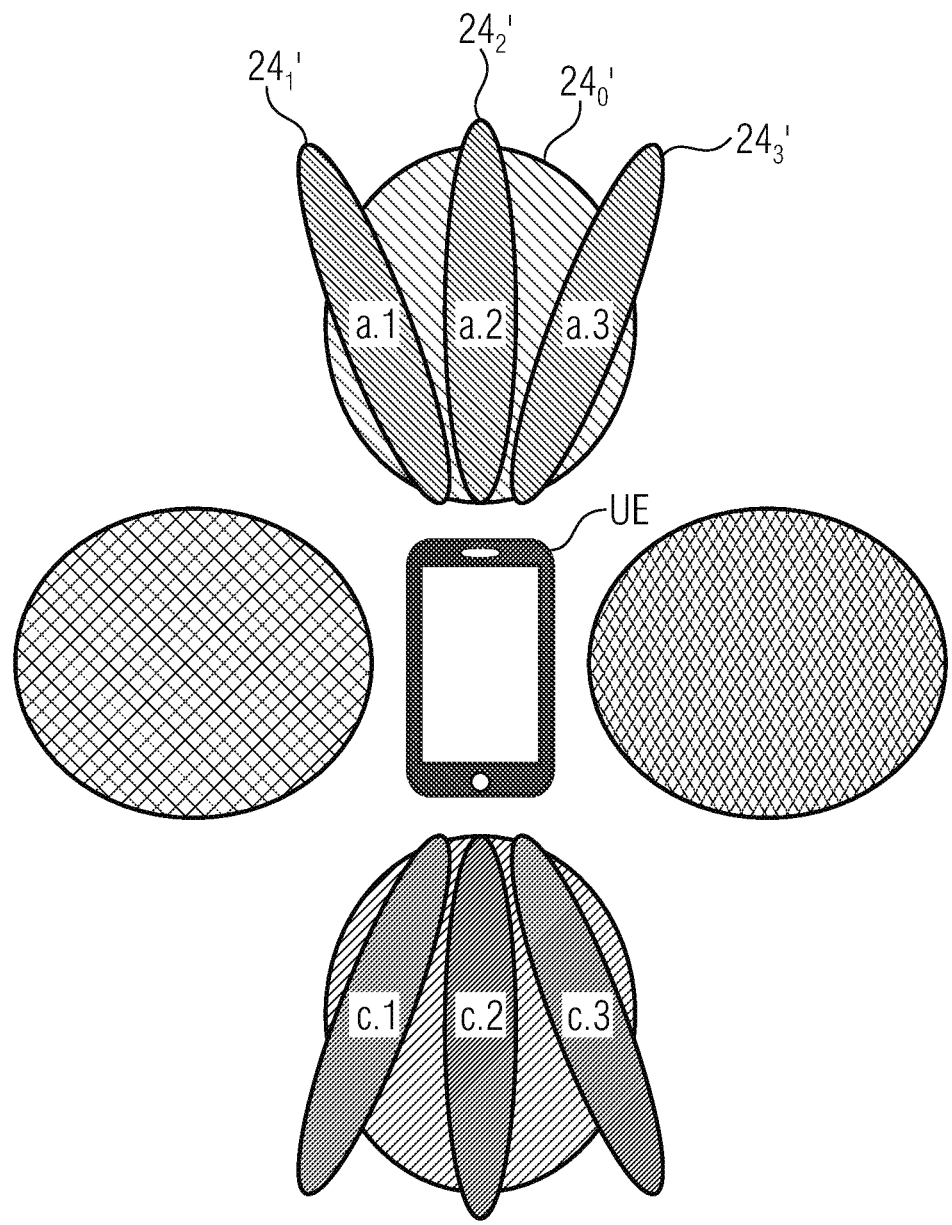

FIG. 6 illustrates examples of beams or antenna patterns for measurements between a UE and a TRP. For example, the TRP may apply beams $24_{1-3}$ for transmitting or receiving a reference signal of respective measurements, and the UE may apply beams $24'_{1-3}$ for receiving or transmitting the reference signals. For example, the TRP may use the same beam while the UE sweeps through the set of beams $24'_{1-3}$, and/or the UE may use the same beam while the TRP sweeps through the set of beams $24_{1-3}$. According to embodiments, a first set of measurements may be performed between the UE and the TRP with beams $24_{1-3}$, while the UE may use the same beam, e.g. a wide beam such as beam $24_0$ illustrated in FIG. 6B. From the first set of measurements, the positioning entity may determine a coarse position of the UE, e.g. a position within (AoD) uncertainty region 29 illustrated in FIG. 6A. For example, the uncertainty region may be a region around a beam associated with the one of the first measurements showing the highest received power. Subsequently, a second set of measurements may be performed, in which the TRP is to use the beam $24_2$ within the uncertainty region 29 and in which the UE uses beams directed towards the uncertainty region 29, e.g. fine beams, e.g. $24'_{1-3}$ as illustrated in FIG. 6A or 6B. That is, the UE may use the information about the uncertainty region 29 to identify the beams $24'_{1-3}$ within the uncertainty region 29, i.e. to identify beams $24'_{1-3}$ pointing towards the uncertainty region 29. The UE may measure and optionally report the measurements within the certainty region. In other words, FIG. 6 illustrates an example for triggering Rx UE beams within an antenna panel to perform AoD measurements and reduce the uncertainty region.

According to embodiments, a method, e.g. method 2.1 comprises using the information in antenna panel related information and/or relation between Tx/Rx beams. The network requests from the UE a beam specific behavior. As an example, during a DL reception, the UE may use a wide beam to receive the DL-PRS from multiple resources of the same TRP. If the UE can steer one or more narrower beams ([a1, a2, a3] or [c1, c2, c3] in FIG. 6B), a better estimate of the AoD can be achieved and the DL-PRS resources needed are reduced. The reduction and estimation accuracy enhancements are achieved due to less ambiguity from the contributing direction from the different lobes of the narrow beams.

DL-PRS Related Procedure (for AoD)

UE procedure to report information on the relation between Rx spatial filters:

In one embodiment, the UE may be configured to measure and report multiple DL-PRS measurements from different DL-PRS resources. The UE may provide information on the reported DL-PRS measurements performed with different spatial filters for reception.

The information provided by the UE can include the relation between two different spatial filers, corresponding to at least one of the following:

Same or different antenna panels.

Antenna panel ID.

Angle information (such as Dominant Angle, Average Angle, AoA/AoD Power Angular Spectrum, transmit/receive channel correlation, transmit/receive beamforming, spatial channel correlation etc.).

In one embodiment, the UE reports measurement groups where each group corresponds to a spatial relation configuration (i.e., relation between Tx/Rx beams) or based on the antenna panel related information.

UL-SRS Related Procedure (for AoA)

UE procedure to report information on the relation between Tx spatial filters:

In one embodiment, the TRP may be configured to measure and report to the LMF multiple UL SRS measurements from different UL SRS resources. The TRP may provide information of the reported UL SRS measurements performed with different spatial filters for reception.

The information provided by the TRP can include the relation between two different spatial filers corresponding to at least one of the following:
Same or different antenna panels.
Antenna panel ID.
Angle information (such dominant angle, average angle, AoA/AoD power angular spectrum, transmit/receive channel correlation, transmit/receive beamforming, spatial channel correlation etc.).

If a UE is configured with a spatial relation, then the SRS is transmitted in the direction of this indicated spatial relation (this can be a Tx spatial relation or an Rx spatial relation).

In one embodiment, if configured with the higher layer parameters spatial relation with multiple SRS resources, the UE may transmit the SRS resources using different Tx spatial filters. The UE is not expected to transmit an SRS resource on Tx spatial filter where no Tx beam overlap exists, or Tx spatial filter where no reception is achieved for Rx spatial.

During an AoA operation, if the UE changes its power and the network is not aware of the power or power difference applied between the SRS resources or the SRS resources with an SRS resource set. Whereby, an SRS resource set can correspond to a different SRS configuration (e.g., different bandwidth, period, or comb configuration) or a transmission over different UE panels. Since, the network cannot estimate AoA measurements then:

In one embodiment, the UE is not expected to update the transmit power for the SRS resources within an SRS resource set. If indicated by the network, the UE should not update the power control for the SRS resource sets for SRS resource set for positioning use.

In one embodiment, the UE shall provide the power level or power level differences for the SRS resources or resource sets used for positioning.

Example on a DL Procedure for Method 2.1:
1. Configure the UE with PRS resource configuration for AoD measurements.
2. UE provides the LMF with information on AoD capabilities.
3. UE performs measurements on the PRS resources.
4. If capable, the UE reports information on the Rx beam relation or antenna panel configuration
5. If needed, the network can configure the UE for Rx beam measurements with different configurations but have similar spatial relations (like [a1, a2, a3] or [c1, c2, c3] in FIG. 6B).
6. Use this information at the LMF to compute an AOD estimate.

Method 2.2 Use Beam Information to Get an Accurate Direction Estimate

RSRP Differences Over the Same PRS_ID

Figure 7:
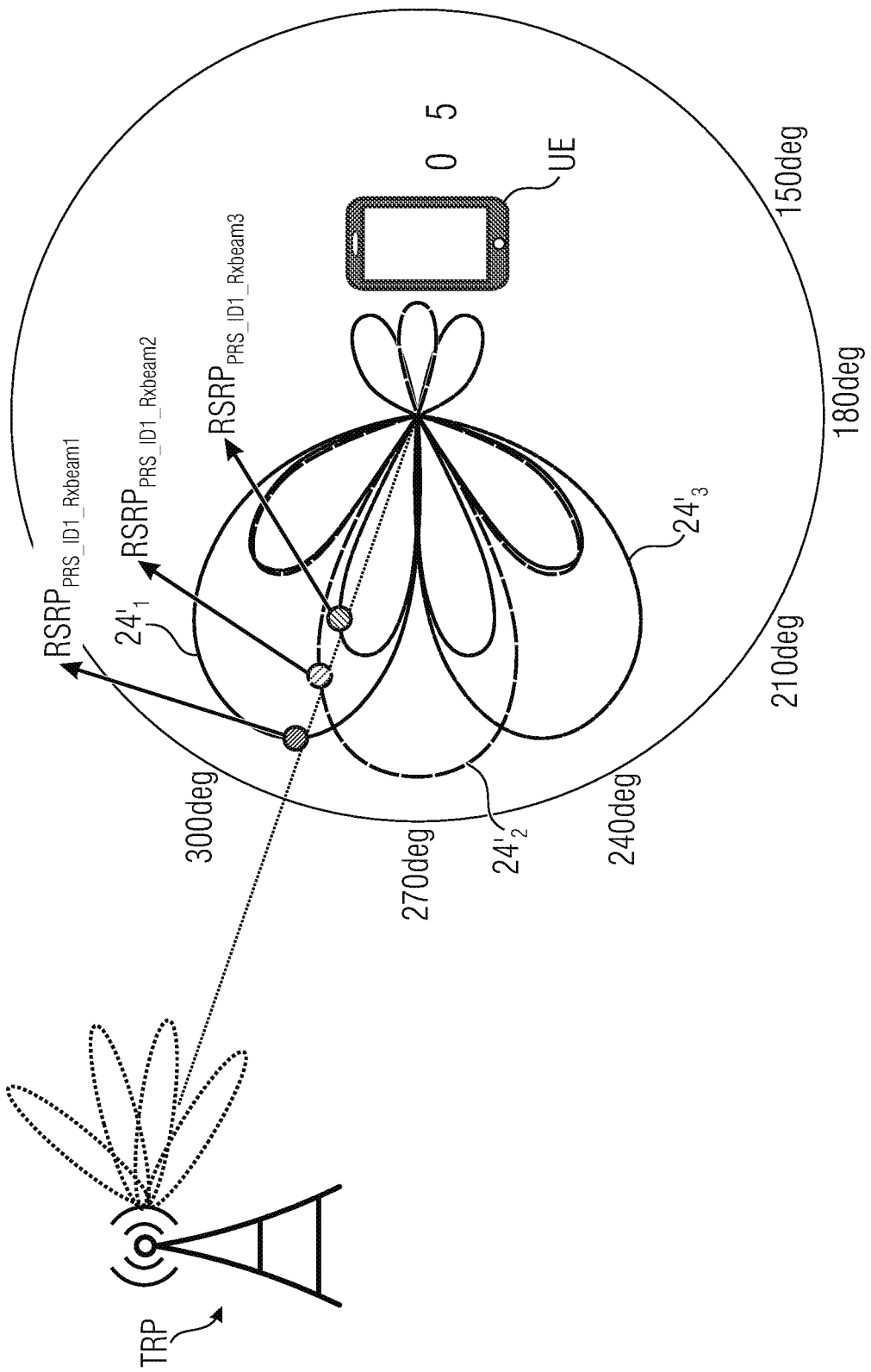
FIG. 7 illustrates an example of a position estimation using different UE beams.
Figure 8A:
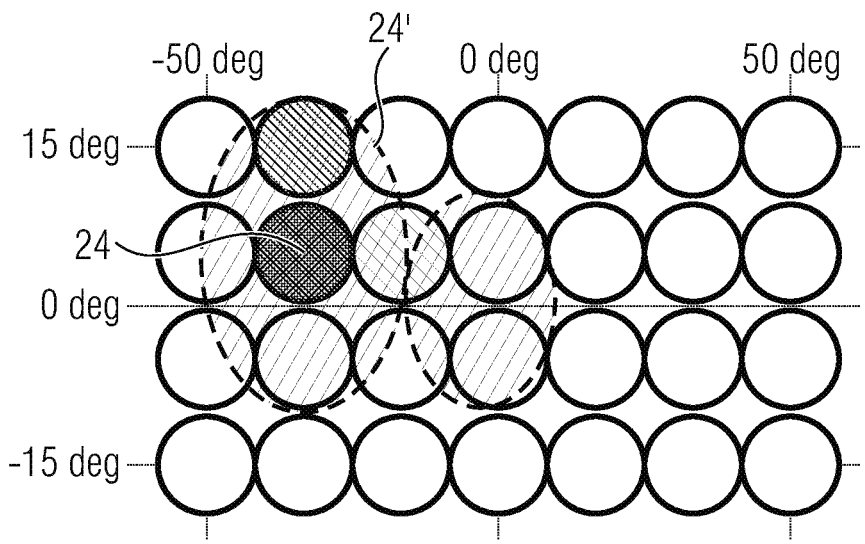
FIG. 8A-D illustrate examples of directional characteristics of UE beams and TRP beams.
Figure 8B:
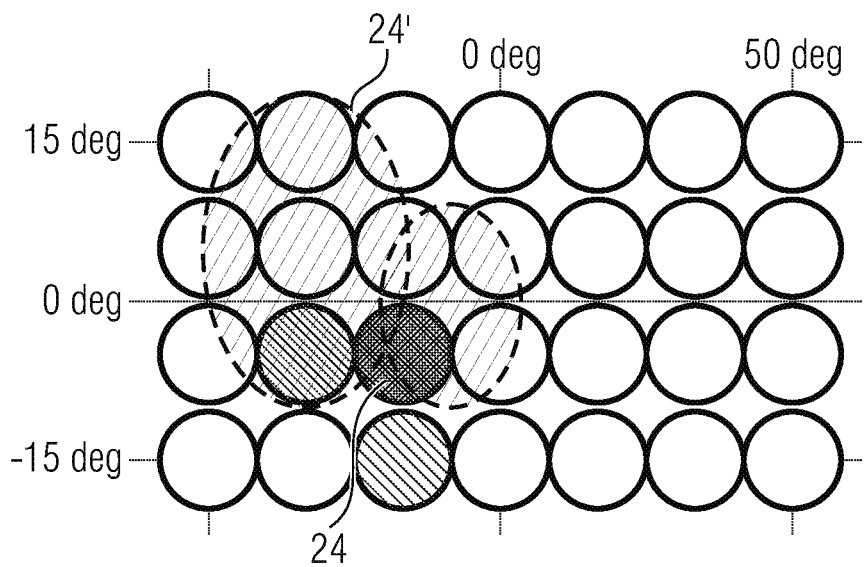
Figure 8C:
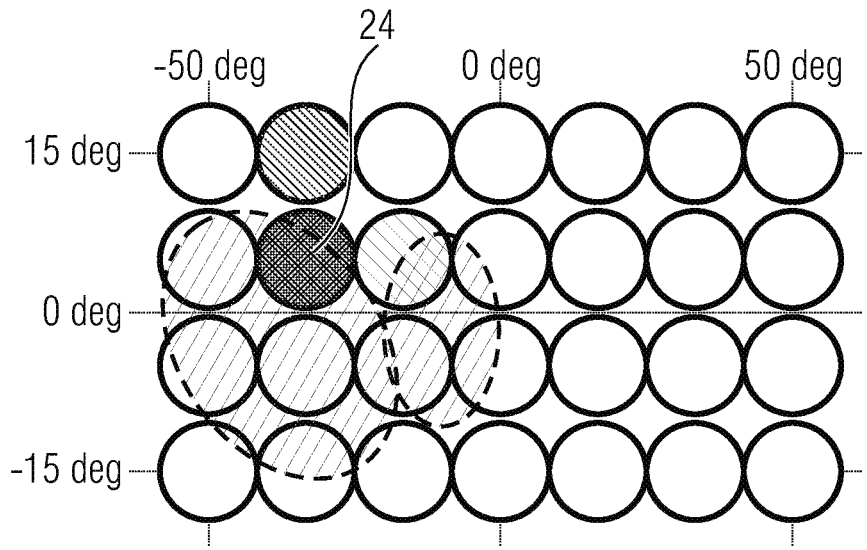
Figure 8D:
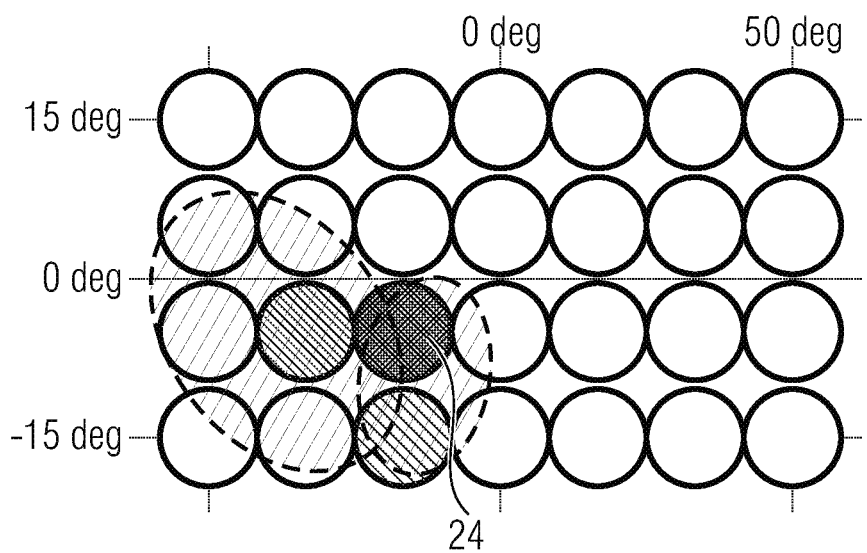

FIG. 7 illustrates an example of a position estimation using the same PRS_ID, that is, e.g. using the same antenna pattern or beam at the TRP. For example, according to FIG. 7, a UE with 3 Rx beams $24'_{1-3}$ measures 3 RSRPs from 1 PRS resource.

For example, one antenna panel can be configured to direct multiple beams. If the direct path (i.e., LOS link) is valid as indicated in the figure, the positioning entity can make a direct use of the measurements from at least two of the three beams. In this case, the UE measures at least the RSRP and optionally a timing related measurement for one DL-PRS resource. Subject to UE capability, the UE can be configured to simultaneously perform a measurement on two or more different RX spatial filters.

DL-PRS Related Procedure (for AoD)
UE procedure to report RSRP with beam relation Rx spatial filters:
In one embodiment, the UE may be configured to measure and report multiple DL PRS measurements from different DL PRS resources. If configured by high layers, the UE may provide information on the angular direction and optionally the related beam level (i.e., beam radiation) on the performed measurements (e.g., RSRP) with different Rx spatial filters.
In one option, the UE can be configured to report an index from a predefined codebook on the used Tx or Rx beam.
In a second option:
If the UE is configured to report a spatial relation information for AoD using UE beam information, the UE can provide the network with the direction and optionally related beam level, where the provided information includes at least one of the following:
Direction information on:
NR PRS RxBeam Azimuth
NR PRS RxBeam Azimuth fine
NR PRS RxBeam Elevation
NR PRS RxBeam Elevation fine
Beam level information
NR PRS RxBeam Azimuth coarse level
NR PRS RxBeam Azimuth fine level
NR PRS RxBeam Elevation coarse level
NR PRS RxBeam Elevation fine level
If the UE is configured to report a spatial relation information for AoA using UE beam information, the UE can provide the network with the direction and optionally related beam level, where the provided information includes at least one of the following:
Direction information on:
NR PRS TxBeam Azimuth coarse
NR PRS TxBeam Azimuth fine
NR PRS TxBeam Elevation coarse
NR PRS TxBeam Elevation fine
Beam level information
NR PRS TxBeam Azimuth coarse level
NR PRS TxBeam Azimuth fine level
NR PRS TxBeam Elevation coarse level
NR PRS TxBeam Elevation fine level UE Measures DL-PRS Resources that Minimize TOA Error:
In one embodiment, the UE can be configured to measure and report the relative TOA between the different timing measurements corresponding to one or more PRS resources.
The information could also be used to determine the LOS quality for a PRS resource measured on multiple Rx beams. This can enable a classification for the LOS/NLOS links by including multiple PRS resources.
Orientation: based on the provided additional information, the network is able to detect a change in orientation. The network is able to use multiple PRS and/or SRS measurements to estimate a UE orientation.

Orientation: the network or UE is able to use the information on the beam patterns from two different resources corresponding to two different Tx/RX beams in order to estimate a UE orientation.

Orientation: the network or UE is able to use the additional information from UE sensors get be better orientation estimate.

FIG. 8 illustrates examples of UE beams 24' and TRP beams 24 for different UE orientations. In FIG. 8A and FIG. 8C, the TRP beam 24, e.g. a Tx beam in a DL measurement, has a first orientation, whereas it has a second orientation in FIG. 8B and FIG. 8D. The UE beam 24' has a first orientation in FIG. 8A and FIG. 8B, and has a second orientation in FIG. 8C and FIG. 8D.

3.4 Use Relative TOA Difference for the FAP and Optionally for Multipath Components Between Beam Resources For example, the herein described method may be implemented by the apparatus described in the general part of section 3.

Method 3:
  Estimate an RSRP related to the FAP and optionally later paths.
  Report additional measurements (other than RSRP) related to TOA of the FAP or a common cluster between different TX beams.
  Use the information for estimating a better DoA/AoA by detecting NLOS links (UR-TRP) and using the LOS RSRP:
    If the UE (as a measuring device in DL AoD mode) detects that timing from one PRS resource is longer than the time expected when compared to the ToA of the first arriving beam. Then the UE can assume the propagation channel for this PRS resource corresponds to a NLOS reception and hence can be sorted for AoD determination.
  Combine (1) and (2) which enables identifying the cluster position (in case of a single bounce).
Relative TOA Between Beam of the Same Resource Set:
  1. The UE measures the TOA from the received signal of one or more links corresponding to two or more PRS resources within a PRS resource set of the same gNB/TRP.

$$toa_{PRS1}=tot_{PRS1}+tof_1$$

$$toa_{PRS2}=tot_{PRS2}+tof_2$$

$$toa_{PRSn}=tot_{PRSn}+tof_n$$

$$tot_{PRS1}=tot_{PRS2}+\text{Offset}+\varepsilon_{osci}$$

Where the offset is a time offset determined w.r.t to the SFN, subframe offset, slot-, symbol-, sub-symbol, ns-offset, etc.), which is derived based on the PRS resource/resource set configuration. $\varepsilon_{osc}$ is the error resulting form the UE oscillator between the two measurements.
  A time difference measurement can hence be extracted as:

$$tot_{PRS1}-tot_{PRS2}=tof_1-tof_2+\text{Offset}+\varepsilon_{osci}$$

By extracting the known Offset, the relative time difference between the received PRS1 and PRS2 $RTD\_B_{PRS1,PRS2}$ can be expressed as:

$$RTD\_B_{PRS1,PRS2}=toa_{PRS1}-toa_{PRS2}-\text{Offset}=tof_1-tof_2+\varepsilon_{osci}$$

More generally the RTD_B can be expressed in terms of a reference PRS resource and a second PRS resource as:

$$RTD\_B_{PRSref,PRSn}=toa_{PRSref}-toa_{PRSn}-\text{Offset}=tof_{ref}-tof_n+\varepsilon_{osci}$$

The impact of $\varepsilon_{osci}$ is negligible over small time-intervals: the UE or the NW can estimate if the signal from one of the two PRS resources experienced a longer propagation time than each other.
  As an example:
    Case 1: If $RTD\_B_{PRS1,PRS2}$ is in the range of $[-X \times T_s, X \times T_s]$, then the 2 PRS signals experienced the "similar propagation channel.
    Case 2:
      If $RTD\_B_{PRS1,PRS2}$ has a positive value and is out of the range of $[X \times T_s, X \times T_s]$, then PRS1 experienced a longer delay than PRS2
    Case 3:
      If $RTD\_B_{PRS1,PRS2}$ has a negative value and is out of the range $[X \times T_s, X \times T_s]$, then PRS2 experienced a longer delay than PRS1.
      Where, X depends on the AoD accuracy target $X=\{0.01, \ldots, 0.5, \ldots, 10\}$
  2. The UE reports the time difference of arrival of beams relative to a reference beam, which may be the strongest beam or the beam with best LOS quality, and/or the UE reports a Flag (TOA-mismatch) or quality on the reported RSRPs per PRS resource, where the quality provides on the LOS/NLOS situation for a PRS resources in different direction w.r.t to a reference beam.

Embodiments provide a method for receiving two or more reference signals (RS) transmitted with different beams (similarly, antennas) configuration. Processing the RSRP and TOA of at least the FAP of received RSs; wherein the receiving unit (UE) is configured with transmission information of the RS and uses this information to estimate a relative time difference for the RSs transmitted from the same wireless device (TRP) and based on the measurements estimate an AOD.

The UE measures the relative timing differences between the PRS resources of a PRS resource set. The UE identifies the best beam or a set of best beams for each PRS resource set. The UE chooses best beam by taking the RTD_B measurements and the RSRP of the PRS resource for detectability into account. The UE may compare the RTD_B measured between as selected a PRS resource with the best beam PRS and classify a quality for the AoD measurement wherein this quality is related to a LOS/NLOS quality estimate.

According to embodiments, the LMF can use the information (beam level) provided in method 1(A in the claim), and the UE RSRP, RTD_B measurements between two resources to identify a direction corresponding the main steering direction or the secondary "predetermined" direction.

3.5 Further Embodiments

In the following, further embodiments are described, which may be combined with any of the features, functionalities and details described with respect to the previous embodiments, and the embodiments described by the claims.

A1.1 An apparatus (e.g. a positioning entity) for determining a position of an entity (e.g. a user UE) of a wireless communication network, the apparatus comprising:
- a position determining processor to determine a position of a first entity (e.g. a user UE) in the wireless communication network using information about one or more measurements between the first entity and one or more second entities (e.g. entities of known positions, e.g. a TRP), each of the first and second entities comprising one or more antennas (e.g. an antenna may comprise an antenna array, or antenna panel, having a plurality of antenna elements) to transmit and/or receive a reference signal for the measurement, wherein at least one of the antennas is used for transmitting or receiving the reference signal for at least one of the measurements,
- wherein the information about the measurement comprises information about a steering direction towards which the antenna is directed for the measurement (e.g., the steering direction may be characterized by a direction and a beam form indication, e.g. a width), and further comprises information about a gain (e.g. a level of the gain) of the antenna towards a predetermined direction when the antenna is directed towards the steering direction. (E.g., the steering direction may correspond to a direction towards which a main lobe of the antenna is directed, and the predetermined direction may correspond to the direction of a side lobe of the antenna when directed towards the steering direction.)

A1.2 Apparatus according to embodiment A1.1, wherein the predetermined direction points towards the direction of a side lobe of the antenna gain (i.e. a side lobe of an angular distribution of the gain of the antenna) when the antenna is directed towards the steering direction.

A1.3 Apparatus according to embodiment A1.1 or A1.2, wherein the information about the measurement is indicative of
- a gain level for the steering direction and a gain level for the predetermined direction, or
- a relative gain level between the steering direction and the predetermined direction.

A1.4 Apparatus according to any of the embodiment A1.1 to A1.3, wherein the wherein the information about the measurement is indicative of one or more below-threshold directions at which the gain of the antenna, when directed towards the steering direction, is below a predetermined gain threshold (e.g. is zero).

A1.4a Apparatus according to any of the embodiment A1.1 to A1.4, wherein the information about the measurement is indicative of one or both of an azimuth angle and an elevation angle for indicating a direction out of the steering direction, the predetermined direction, and the below-threshold direction.

A1.5 Apparatus according to any of the embodiment A1.1 to A1.4a, wherein the wherein the reference signal for the measurement is transmitted using predetermined radio resourced, and
- wherein the information about the measurement is indicative of a received signal strength (e.g. a RSRP value) measured for the predetermined radio resources.

{definition of how to use the gain level information}

A1.6 Apparatus according to embodiment A1.5, wherein the position determining processor is to
- determine a signal strength relation (e.g. difference, ratio) between a value of the received signal strength for the measurement and a value of the received signal strength for a further of the measurements,
- evaluate a degree of a matching between the signal strength relation and a relation between a gain level for the predetermined direction for the measurement and a gain level associated with the further measurement. (E.g., the gain level associated with the further measurement refers to a gain of the antenna used for the further measurement (for transmitting or receiving the respective reference signal, which, e.g., corresponds to the antenna), in a steering direction of the antenna for the further measurement, or a predetermined direction, when the antenna for the further measurement is directed towards a steering direction for the further measurement. E.g., the steering direction of the further measurement differs from the steering direction of the measurement).

A1.7 Apparatus according to any of the embodiment A1.1 to A1.6, wherein the apparatus is to receive a validity information about a validity of the one or more measurements, and
- wherein the position determining processor is to selectively determine the position of the first entity using the one or more measurements in dependence on the validity information. (E.g., the validity information may indicate the one or more measurements to be valid or to be invalid. E.g. the measurements may be indicated to be invalid, if a position and/or orientation of the first entity, or a direction towards which the antenna for receiving the respective reference signals for the measurements changed during acquisition of the one or more measurements.)

A1.7a Apparatus according to any of the embodiment A1.1 to A1.7, wherein the apparatus is to receive an information about a change of a position and/or an orientation of the first entity during an acquisition of the one or more measurements, and
- wherein the position determining processor is to consider the information about the change of the position and/or the orientation in the determination of the position of the first entity.

A1.8 Apparatus according to any of the embodiment A1.1 to A1.7a, wherein the apparatus is provided in one or more of
- a core entity, like a Location Management Function, of a core of the wireless communication network, the core entity to receive the information about the one or more measurements (e.g. from the first entity and/or the one or more second entities and/or a service provider),
- the first entity, e.g., a radio access network, RAN, entity or a user device, UE, of the wireless communication network, the first entity to receive the information about the steering direction and the information about the gain (e.g. from one of the second entities, or a core entity or a service provider),
- the one or more second entities, e.g., a radio access network, RAN, entity, or a transmission reception point, TRP, of the wireless communication network.

A1.9 Apparatus according to any of the embodiment A1.1 to A1.8,
- wherein the information about the measurements comprises information about times of flight (e.g. time of flight values) of the respective reference signals.

A1.10 Apparatus according to embodiment A1.9, wherein the position determining processor is to
  determine, for a set of measurements between the first entity and one of the second entities, a time of flight (e.g. a time of flight value) of a first arriving path, FAP, (e.g. by determining the shortest time of flight beyond the set of measurements as the time of flight of the FAP) and
  selectively consider a measurement of the set of measurements for the determination of the position of the first entity, if the time of flight for the measurement is within a predetermined range around the time of flight of the first arriving path.

A2.1 An apparatus (e.g. the first entity, a user device, UE) for a wireless communication network, comprising one or more antennas for transmitting and/or receiving a radio signal,
  wherein the apparatus is to transmit or receive respective reference signals for a set of measurements, and
  wherein the apparatus is to provide (e.g. to a core entity or a second entity) an acquisition information about the acquisition of the set of measurements.

A2.2 Apparatus according to embodiment A2.1, wherein the apparatus is to detect a change of a position and/or an orientation of the apparatus during an acquisition of the set of measurements, and
  wherein the apparatus is to provide a validity information (as the acquisition information) for the set of measurements in dependence on whether a change was detected or not.

A2.3 Apparatus according to embodiment A2.1 or A2.2, wherein the apparatus is to detect a change of a position and/or an orientation of the apparatus during an acquisition of the set of measurements, and
  wherein the apparatus is to provide an information (as the acquisition information) about a detected change of the position and/or the orientation (e.g. a direction and/or an amount of the change).

A2.4 Apparatus according to embodiment A2.1 to A2.3, wherein the apparatus comprises a data storage holding information about characteristics of the one or more antennas, and
  wherein the apparatus is to provide an information (as the acquisition information) about the antenna used for receiving one or more or all of the set of measurements. (E.g. the apparatus is to direct one or more of the antennas towards a steering direction for the measurements and the information about the antenna refers to the antenna when directed towards the steering direction used for the measurements.)

A3.1 An apparatus (e.g. one or the second entities, a TRP) for a wireless communication network, comprising one or more antennas for transmitting and/or receiving a radio signal,
  wherein the apparatus is to transmit and/or receive respective reference signals for one or more measurements, wherein the apparatus is to use at least one of the antennas for transmitting or receiving the reference signal for at least one of the measurements,
  wherein the apparatus is to direct the antenna towards a steering direction for the measurement, and
  wherein the apparatus is to provide (e.g. to the apparatus for determining a position of an entity, which, e.g. is part of the apparatus, or a core entity, or an another apparatus for the wireless communication network) information about the measurement, the information comprising information about the steering direction, and further comprising information about a gain (e.g. a level of the gain) of the antenna towards a predetermined direction when the antenna is directed towards the steering direction.

B1.1 An apparatus (e.g. a positioning entity) for determining a position of an entity (e.g. a user UE) of a wireless communication network, the apparatus comprising:
  a position determining processor to determine a position of a first entity (e.g. a user UE) in the wireless communication network using information about a set of measurements between the first entity and one or more second entities (e.g. entities of known positions, e.g. a TRP), each of the first and second entities comprising one or more antennas (e.g. an antenna may comprise an antenna array, or antenna panel, having a plurality of antenna elements) to transmit and/or receive respective reference signals for the measurements, the antennas being steerable towards one or more steering directions,
  wherein the information about the measurements comprises antenna information associated with respective antennas and/or respective steering directions used by the first entity for transmitting or receiving the respective reference signals for the measurements.

B1.2 Apparatus according to embodiment B1.1, wherein the apparatus is to
  determine a coarse position of the first entity using information about one or more coarse measurements between the first entity and the one or more second entities,
  determine, in dependence on the coarse position, a set of antenna configurations to be used by the first entity for the set of measurements (wherein, e.g., each of the antenna configurations is indicative of an antenna and/or a corresponding steering direction to be used for the corresponding measurement).

B1.3 Apparatus according to embodiment B1.1 or B1.2, wherein the antenna information is indicative of one or more of
  antenna panel information (e.g., indicating relative positions and/or orientations and/or boresights of two or more antennas with respect to each other),
  steering direction information (e.g., indicating a relation between spatial parameters for two or more steering directions of an antenna (used for two or more of the measurements), e.g., indicating one or more of relative orientations and/or beamwidths and/or boresights and/or angle information),
  antenna characteristics information (e.g., indicating, for one or more steering directions of one or more antennas, one or more of an orientation, a beam width, a boresight, angle information (e.g. dominant angle, average angle, power angular spectrum, transmit/receive channel correlation, transmit/receive beamforming, spatial channel correlation)),
  antenna polarization information.

B1.3a Apparatus according to embodiment B1.1 to B1.3, wherein the apparatus is to receive an antenna information identifier (e.g. from the first entity), and to retrieve the antenna information using the antenna information identifier (e.g., the apparatus comprises a data storage holding the antenna information, or the apparatus is to use the antenna information identifier to request the antenna information from a network entity).

B1.3b Apparatus according to embodiment B1.1 to B1.3, wherein the apparatus is to receive the antenna information (e.g. from the first entity).

B1.4 Apparatus according to any of embodiment B1.1 to B1.3, wherein the apparatus is to detect a change of orientation of the first entity using the antenna information (and, e.g., to determine an amount and a direction of a detected change of orientation and to use the determined change of orientation in the determination of the position of the first entity).

B1.5 Apparatus according to any of embodiments B1.1 to B1.4, wherein the apparatus is to use the antenna information to determine an orientation of the first entity.

B1.6 Apparatus according to any of embodiments B1.1 to B1.5, wherein the apparatus is to use the antenna information for at least two measurements to determine an orientation of the first entity, wherein respective steering directions used for the at least two measurements are different.

B1.7 Apparatus according to any of embodiments B1.1 to B1.6, wherein the information about the measurements comprises information about a time of arrival or a time of flight of the reference signals for the measurements.

B1.8 Apparatus according to any of the embodiment A1.1 to A1.7, wherein the information about the measurements comprises information about respective transmission powers of the measurements of the set of measurements.

B1.8 Apparatus according to any of the embodiment A1.1 to A1.7,
wherein the information about the measurement comprises information about a steering direction towards which the antenna is directed for the measurement (e.g., the steering direction may be characterized by a direction and a beam form indication, e.g. a width), and further comprises information about a gain (e.g. a level of the gain) of the antenna towards a predetermined direction when the antenna is directed towards the steering direction.

B2.1 An apparatus (e.g. the first entity, a user device, UE) for a wireless communication network, comprising
one or more antennas for transmitting and/or receiving a reference signal, wherein each of the one or more antennas is steerable towards one or more steering directions (e.g., an antenna may be fix or may be steerable),
wherein the apparatus is to transmit or receive respective reference signals for a set of measurements, wherein the apparatus is to use at least one of the antennas for the set of measurements, and
wherein the apparatus is to direct the antenna towards respective steering directions for the measurements.

B2.2 Apparatus according to embodiment B2.1, wherein the apparatus is to direct the antenna towards a plurality of different steering directions for the set of measurements.

B2.2a Apparatus according to embodiment B2.1 or B2.2, wherein the reference signals for the set of measurements originate from a common network entity and propagate towards a common direction.

B2.2b Apparatus according to embodiment B2.1 to B2.2a, while receiving reference signals originating from and propagating to a fixed direction, the apparatus is to direct the antenna towards a plurality of steering directions for the measurements.

B2.2c Apparatus according to any of embodiments B2.1 to B2.2b, wherein the radio resources which are used for the reference signals for the set of measurements (e.g. the radio resources which are measured for receiving the reference signals or which are used for transmitting the reference signals) are associated with a reference resource set for which a network entity (e.g. a second entity, TRPs) is configured or preconfigured to direct one or more antennas of the network entity towards a predetermined steering direction for receiving or transmitting the reference signals (e.g. the network entity is to transmit the reference signals and the apparatus is to receive the reference signals or vice versa).

B2.3 Apparatus according to any of embodiments B2.1 to B2.2a, wherein the apparatus is to provide antenna information (e.g. assistance data) associated with respective antennas and/or respective steering directions used for the measurements.

B2.4 Apparatus according to embodiment B2.3, wherein the apparatus comprises a data storage holding information about characteristics of the one or more antennas, and wherein the apparatus is to provide an information (e.g. as the antenna information) about the characteristics of the respective antennas tor the respective steering directions used for the measurements.

B2.5 Apparatus according to embodiment B2.3 or B2.4, wherein the antenna information is indicative of one or more of
antenna panel information (e.g., indicating relative positions and/or orientations and/or boresights of two or more antennas with respect to each other),
steering direction information (e.g., indicating a relation between spatial parameters for two or more steering directions of an antenna (used for two or more of the measurements), e.g., indicating one or more of relative orientations and/or beamwidths and/or boresights and/or angle information),
antenna characteristics information (e.g., indicating, for one or more steering directions of one or more antennas, one or more of an orientation, a beam width, a boresight, angle information (e.g. dominant angle, average angle, power angular spectrum, transmit/receive channel correlation, transmit/receive beamforming, spatial channel correlation)),
antenna polarization information.

B2.6 Apparatus according to any of embodiments B2.1 to B2.5, wherein the apparatus is to transmit the reference signals for the set of measurements using a common transmission power.

B2.7 Apparatus according to any of embodiments B2.1 to B2.6, wherein the apparatus is to provide information about a transmission power used for transmitting the reference signals for the set of measurements, or to provide information about respective transmission powers used for transmitting the reference signals for the transmission measurements (e.g. relative to each other, e.g. as a difference).

B2.8 Apparatus according to any of embodiments B2.1 to B2.7, wherein the apparatus is to receive an indication of respective radio resources for the reference signals for the set of measurements.

B2.9 Apparatus according to any of embodiments B2.1 to B2.8, wherein the antenna information for a measurement is indicative of one or more of
a steering direction towards which the antenna for the measurement is directed, a predetermined direction (e.g. a side lobe direction),
a gain level for the steering direction and/or a gain level for the predetermined direction,
a relative gain level between the steering direction and the predetermined direction.

B2.10 Apparatus according to any of embodiments B2.1 to B2.8, wherein the apparatus is to receive the reference signals for the measurements, and
wherein the apparatus is to determine, for one or more or all of the reference signals respective times of arrival, and
wherein the apparatus is to provide information about the times of arrival of the reference signals.

3.6 Implementation Alternatives

The previously described embodiments of section 3 may also be implemented as described in the following.

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 19 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the form of electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

Figure 9:
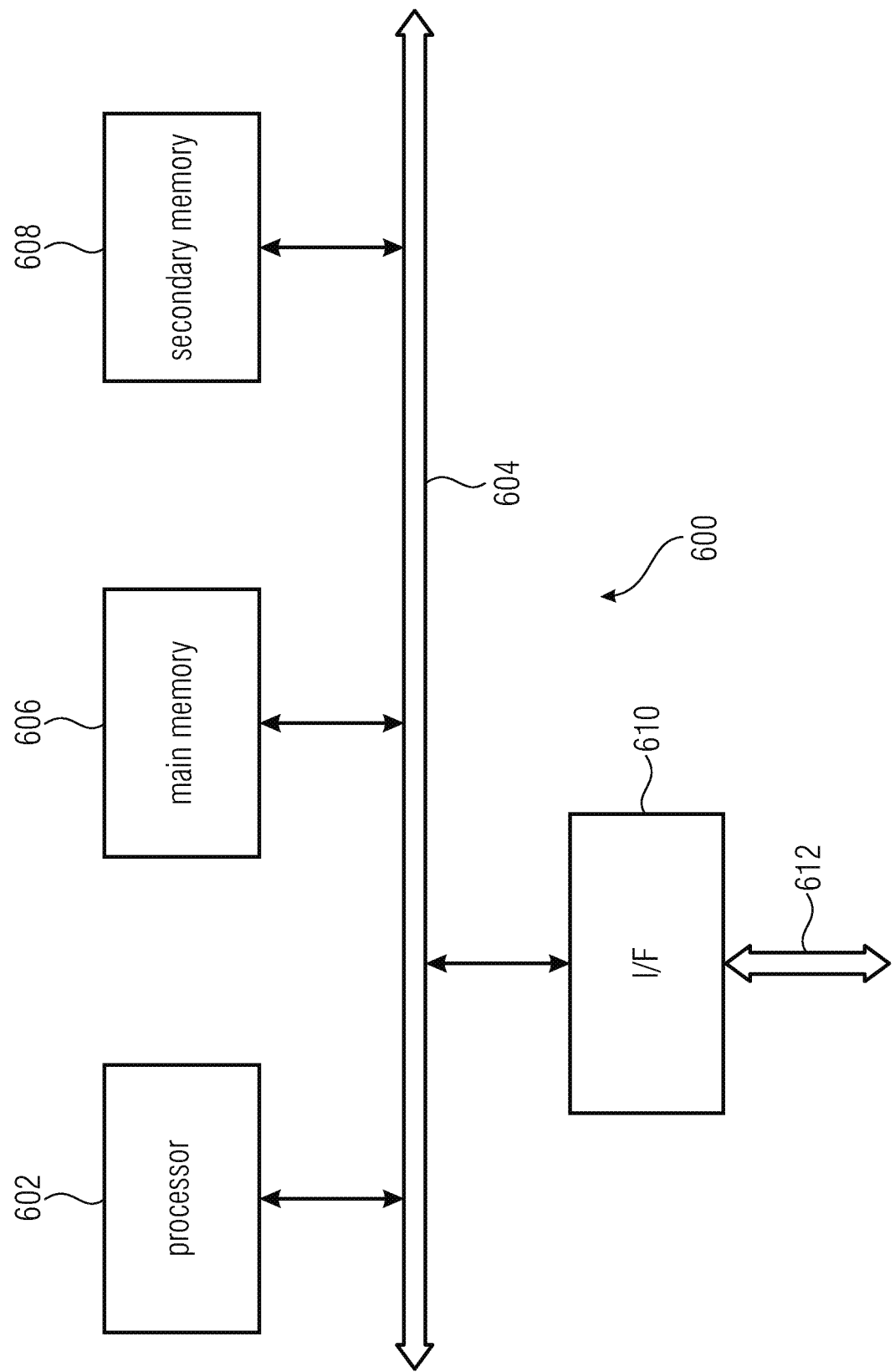
FIG. 9 illustrates an example of a computer system.

In particular, the positioning entity, the position determining processor, the first entity, and the second entity may be implemented by means of a signal processor as illustrated by FIG. 9.

Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples need more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

Abbreviations

| Abbreviation | Meaning |
| --- | --- |
| DCI | Downlink Control Information |
| DL | Downlink |
| FAP | First Arriving Path |
| gNB | Next Generation Node-B |
| IMU | Inertial measurement unit |
| LMF | Location Management Function |
| LMF | Location Management Function |
| LOS | Line Of Sight |
| LPP | LTE Positioning Protocol |
| LPP | LTE Positioning Protocol |
| LTE | Long Term Evolution |
| NLOS | Non Line Of Sight |
| NW | Network |
| OTDoA | Observe Time Difference of Arrival |
| PRS | Positioning Reference Signal |
| RRC | Radio Resource Control |
| RSTD | Reference Signal Time Difference |
| RTOA | Relative Time of Arrival |
| SRS | Sounding reference signal |
| TOA | Time of Arrival |
| TRP | Transmission Reception Point |
| UE | User Equipment |

REFERENCES

| Reference Labels referring to 3GPP NR specifications | Details |
| --- | --- |
| TS38.305 | v16.1.0 |
| TS38.214 | v16.1.0 |
| TS37.355 | v16.1.0 |
| TS38.455 | NG-RAN; NR Positioning Protocol A (NRPPa) v16.0.0 |

The invention claimed is:

1. An apparatus for determining a position of an entity of a wireless communication network, the apparatus being implemented as a microprocessor, the apparatus comprising:
a position determining processor configured to determine
a position of a first entity of the wireless communication network using information about a set of measurements between the first entity and one or more second entities, wherein the first entity is a user equipment, and wherein the one or more second entities are one or more transmission reception points (TRPs), and
wherein, for each measurement of the set of measurements between the first entity and one of the second entities, said one of the second entities uses a respective antenna pattern for transmitting a reference signal for the measurement on a respective positioning reference signal (PRS) resource of a PRS resource set, the PRS resource set being indicative of a plurality of PRS resources associated with respective resource identifiers, and
wherein, in performing the set of measurements, the first entity uses an antenna pattern with an antenna pattern identifier for performing reference signal received power (RSRP) measurements and/or timing measurements on the PRS resources of the PRS resource set,
wherein the antenna pattern used by the first entity for the set of measurements and the respective antenna pattern used by said one of the second entities for transmitting the reference signal for the measurement are specific to an operation of antennas of the first entity and said one of the second entities using respective spatial filters for transmitting or receiving the reference signal,
wherein the information about the measurement comprises antenna pattern information about each of the antenna patterns used by said one of the second entities for the set of measurements, wherein the measurement information indicates, for each of the antenna patterns used by said one of the second entities for the set of measurements, a resource identifier associated with the PRS resource used for the respective measurement, and wherein the antenna pattern information comprises, for each of the antenna patterns, information about a steering direction towards which the antenna pattern is directed, and further comprising information about a gain of the antenna pattern towards one or more predetermined directions, and wherein the first entity is configured for being provided with a configuration information for the set of measurements, the configuration information indicating a configuration of the PRS resources, wherein the position determining processor is configured to use, in determining the position of the first entity, the assumption that the first entity uses the same antenna pattern to measure the plurality of PRS resources of the PRS resource set.

2. Apparatus according to claim 1, wherein the position determining processor is configured to use, in determining the position of the first entity, the assumption that the first entity uses the same antenna pattern to measure the PRS resources of the PRS resource set, if the configuration information comprises a respective indication.

3. Apparatus according to claim 1, wherein the position determining processor is configured to use, in determining the position of the first entity, the assumption that the first entity uses the same antenna pattern to measure the PRS resources of the PRS resource set, if the configuration information comprises an indication, which indicates a grouping of the reference signals by receiver-side antenna pattern.

4. Apparatus according to claim 1, wherein the apparatus is to receive, from the first entity, a report of the set of measurements for each measured PRS resource comprising an indication of the antenna pattern used by the first entity for the set of measurements.

5. Apparatus according to claim 1, wherein the one or more predetermined directions points towards the directions of a side lobes of a gain distribution of the antenna pattern when the antenna pattern is directed towards the steering direction.

6. Apparatus according to claim 1, wherein the antenna pattern information is indicative of
a gain level for the steering direction and respective gain levels for the one or more predetermined direction, or
relative gain levels between the steering direction on the one hand and each of the one or more predetermined directions on the other hand.

7. Apparatus according to claim 1, wherein the antenna pattern information is indicative of one or more below-threshold directions at which the gain of the antenna, when directed towards the steering direction, is below a predetermined gain threshold.

8. Apparatus according to claim 1, wherein the antenna pattern information is indicative of one or both of an azimuth angle and an elevation angle for indicating a direction out of the steering direction, the predetermined direction, and the below-threshold direction.

9. Apparatus according to claim 1, wherein the reference signal for the measurement is transmitted using predetermined radio resources, and
wherein the information about the measurement comprises measurement information which is indicative of a received signal strength measured for the predetermined radio resources.

10. Apparatus according to claim 9, wherein the position determining processor is to
determine a signal strength relation between a value of the received signal strength for the measurement and a value of the received signal strength for a further one of the set of measurements,
evaluate a degree of a matching between the signal strength relation and a relation between a gain level for the predetermined direction for the measurement and a gain level associated with the further one of the set of measurements.

11. Apparatus according to claim 10, wherein, for each of the antenna patterns, the antenna pattern information is indicative of a relative gain level between the steering direction and the predetermined direction.

12. Apparatus according to claim 10, wherein, for the predetermined direction, the antenna pattern information is indicative of a relative gain level between two of the antenna patterns.

13. Apparatus according to claim 1, wherein the apparatus is provided in one or more of
a core entity, of a core of the wireless communication network, the core entity to receive the information about the one or more measurements,
the first entity, entity or a user device, of the wireless communication network,
the one or more second entities, entity, or a transmission reception point, TRP, of the wireless communication network.

14. Apparatus according to claim 1, wherein the apparatus is provided in a core entity, like a Location Management Function, of a core of the wireless communication network, the core entity to receive the information about the one or more measurements, wherein the apparatus is to
provide a configuration information for the measurement, the configuration information indicating the predetermined radio resource to be used for the measurement,
receive the antenna pattern information, and
receive measurement information.

15. Apparatus according to claim 1, wherein the apparatus is provided in the first entity of the wireless communication network, wherein the apparatus is to
receive a configuration information for the measurement, the configuration information indicating the predetermined radio resource to be used for the measurement,
receive the antenna pattern information.

16. Apparatus according to claim 15, wherein the first entity is to receive the reference signal so as to acquire measurement information.

17. Apparatus according to claim 1,
wherein the information about the measurements comprises information about relative times of arrival of the respective reference signals for two or more of the set of measurements.

18. Apparatus according to claim 1, wherein the apparatus is to
determine a coarse position of the first entity using information about one or more coarse measurements between the first entity and the one or more second entities,
determine, in dependence on the coarse position, a set of antenna patterns to be used by one of the second entities for a set of measurements between the first entity and the second entity.

19. A processor implemented method for determining a position of an entity of a wireless communication network, comprising:
determining a position of a first entity of the wireless communication network using information about a set of measurements between the first entity and one or more second entities, wherein the first entity is a user equipment, and wherein the one or more second entities are one or more transmission reception points (TRPs), and wherein, for each of the set of measurements between the first entity and one of the second entities, said one of the second entities is to use a respective antenna pattern for transmitting a reference signal for the measurement on a respective positioning reference signal resource of a PRS resource set, the PRS resource set being indicative of a plurality of PRS resources associated with respective resource identifiers, and wherein, in performing the set of measurements, the first entity is to use an antenna pattern with an antenna pattern identifier for performing reference signal received power measurements and/or timing measurements on the PRS resources of the PRS resource set, wherein the antenna pattern used by the first entity for the set of measurements and the respective antenna pattern used by said one of the second entities for transmitting the reference signal for the measurement are specific to an operation of antennas of the first entity and said one of the second entities using respective spatial filters for transmitting or receiving the reference signal, wherein the information about the measurement comprises antenna pattern information about each of the antenna patterns used by said one of the second entities for the set of measurements, wherein the measurement information indicates, for each of the antenna patterns used by said one of the second entities for the set of measurements, a resource identifier associated with the PRS resource used for the respective measurement, and wherein the antenna pattern information comprises, for each of the antenna patterns, information about a steering direction towards which the antenna pattern is directed, and further comprising information about a gain of the antenna pattern towards one or more predetermined directions, and providing the first entity with a configuration information for the set of measurements, the configuration information indicating a configuration of the PRS resources, wherein the method comprises using, in determining the position of the first entity, the assumption that the first entity uses the same antenna pattern to measure the plurality of PRS resources of the PRS resource set.

20. A non-transitory digital storage medium having a computer program stored thereon to perform a processor implemented method for determining a position of an entity of a wireless communication network, the method comprising:

determining a position of a first entity of the wireless communication network using information about a set of measurements between the first entity and one or more second entities, wherein the first entity is a user equipment, and wherein the one or more second entities are one or more transmission reception points (TRPs), and wherein, for each of the set of measurements between the first entity and one of the second entities, said one of the second entities is to use a respective antenna pattern for transmitting a reference signal for the measurement on a respective positioning reference signal resource of a PRS resource set, the PRS resource set being indicative of a plurality of PRS resources associated with respective resource identifiers, and wherein, in performing the set of measurements, the first entity is to use an antenna pattern with an antenna pattern identifier for performing reference signal received power measurements and/or timing measurements on the PRS resources of the PRS resource set, wherein the antenna pattern used by the first entity for the set of measurements and the respective antenna pattern used by said one of the second entities for transmitting the reference signal for the measurement are specific to an operation of antennas of the first entity and said one of the second entities using respective spatial filters for transmitting or receiving the reference signal, wherein the information about the measurement comprises antenna pattern information about each of the antenna patterns used by said one of the second entities for the set of measurements, wherein the measurement information indicates, for each of the antenna patterns used by said one of the second entities for the set of measurements, a resource identifier associated with the PRS resource used for the respective measurement, and wherein the antenna pattern information comprises, for each of the antenna patterns, information about a steering direction towards which the antenna pattern is directed, and further comprising information about a gain of the antenna pattern towards one or more predetermined directions, and providing the first entity with a configuration information for the set of measurements, the configuration information indicating a configuration of the PRS resources, wherein the method comprises using, in determining the position of the first entity, the assumption that the first entity uses the same antenna pattern to measure the plurality of PRS resources of the PRS resource set.

* * * * *